Jan. 18, 1966 G. F. AROYAN ET AL 3,230,379
OPTICAL SEARCH SYSTEM WITH CONTROLLABLE RETICLE
Filed April 29, 1959 12 Sheets-Sheet 8
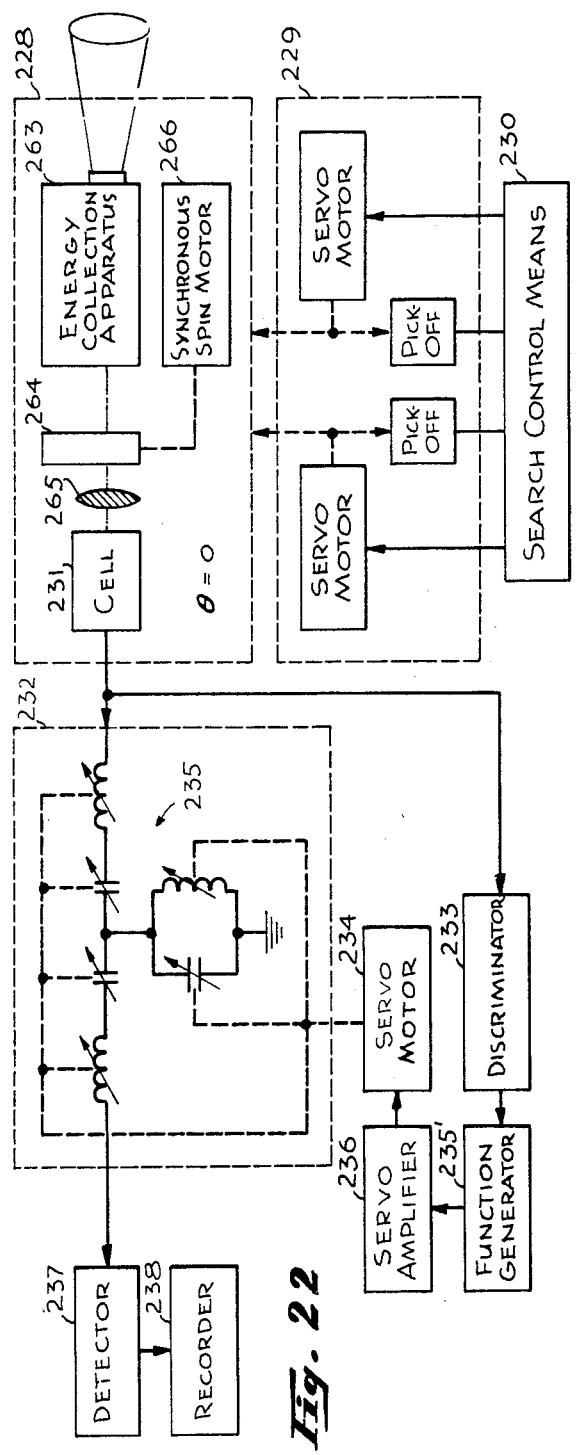
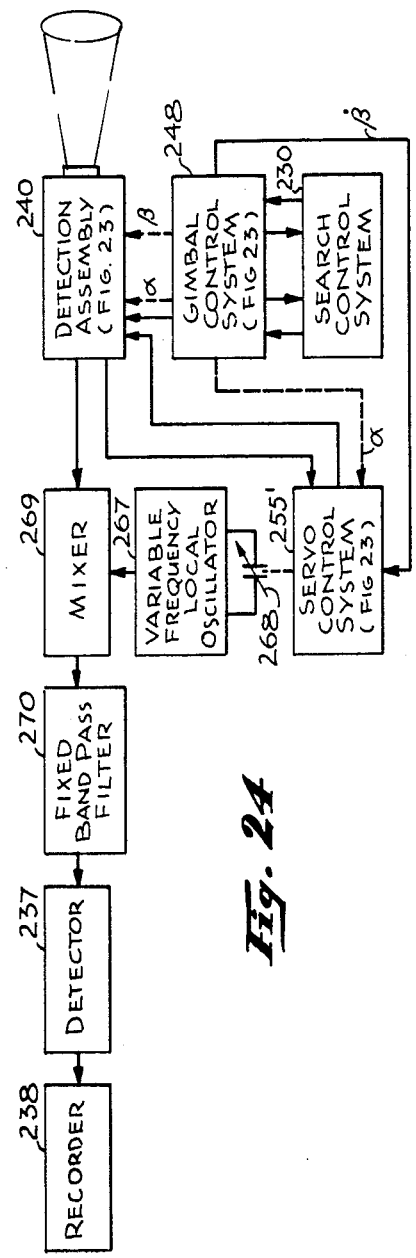
GEORGE F. AROYAN
JOHN A. JANSEN, JR.
INVENTORS
BY
ATTORNEY

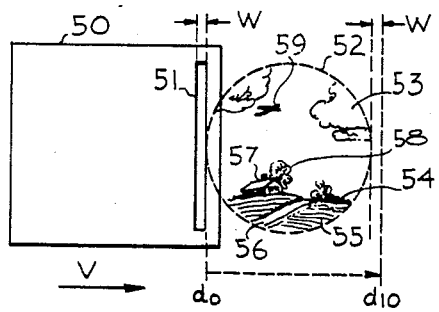
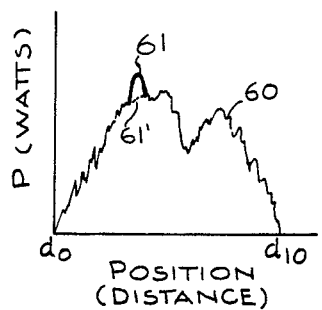
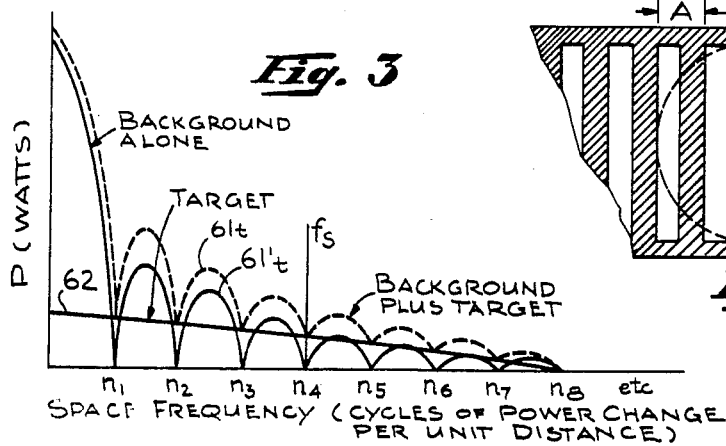
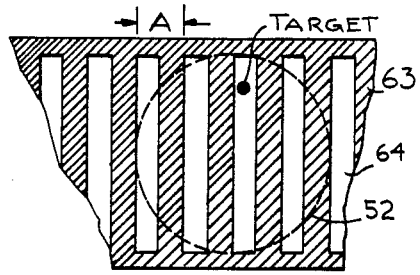
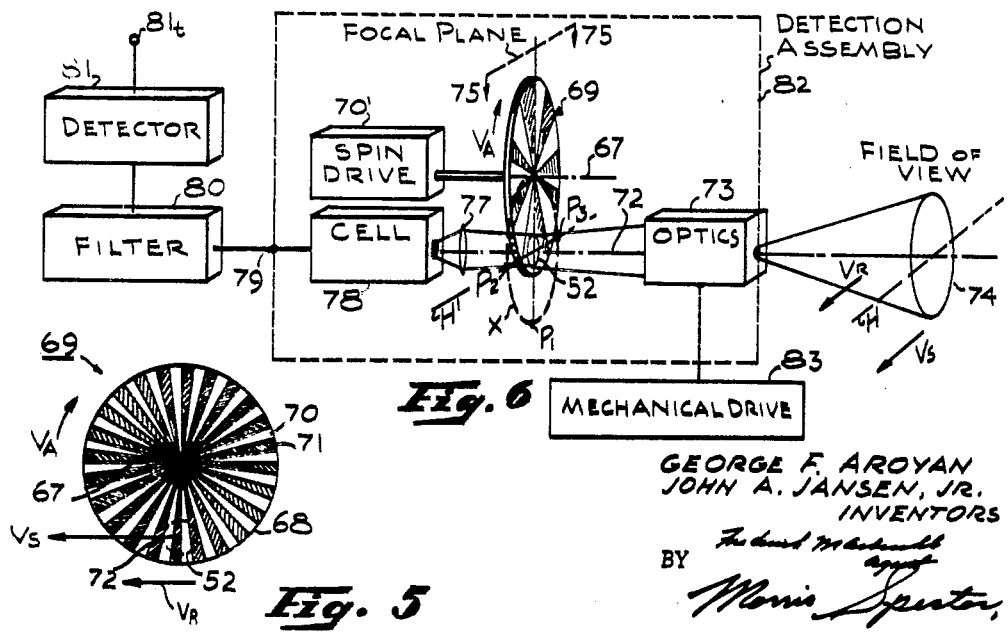

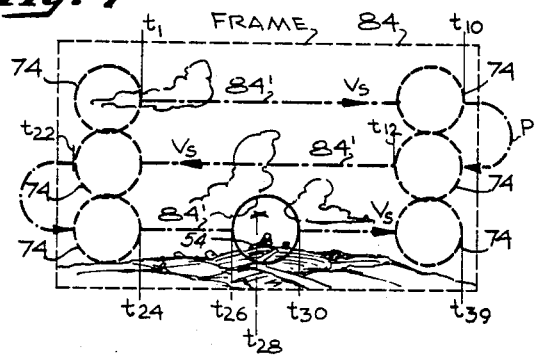
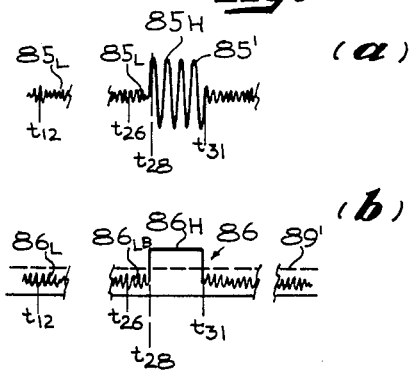
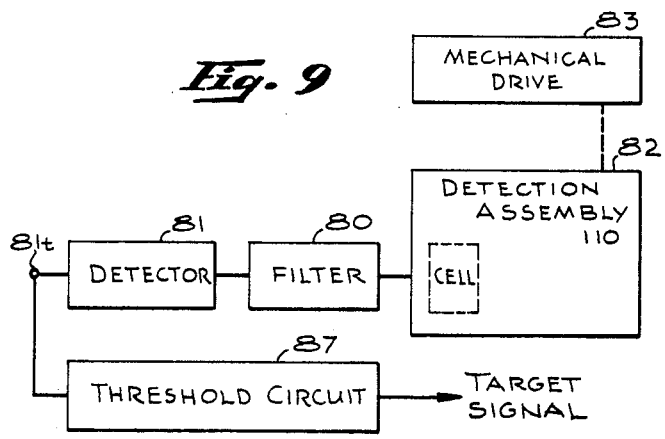
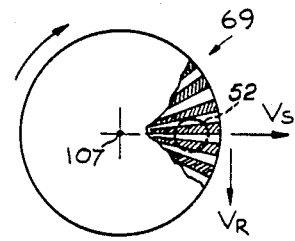
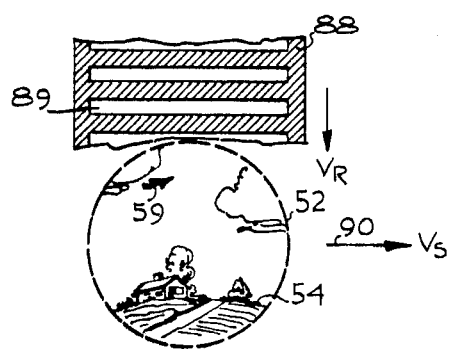
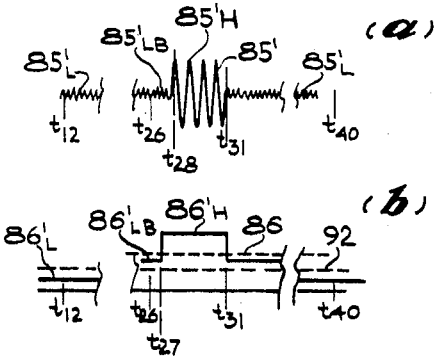
GEORGE F. AROYAN
JOHN A. JANSEN, JR.
INVENTORS
BY
ATTORNEY

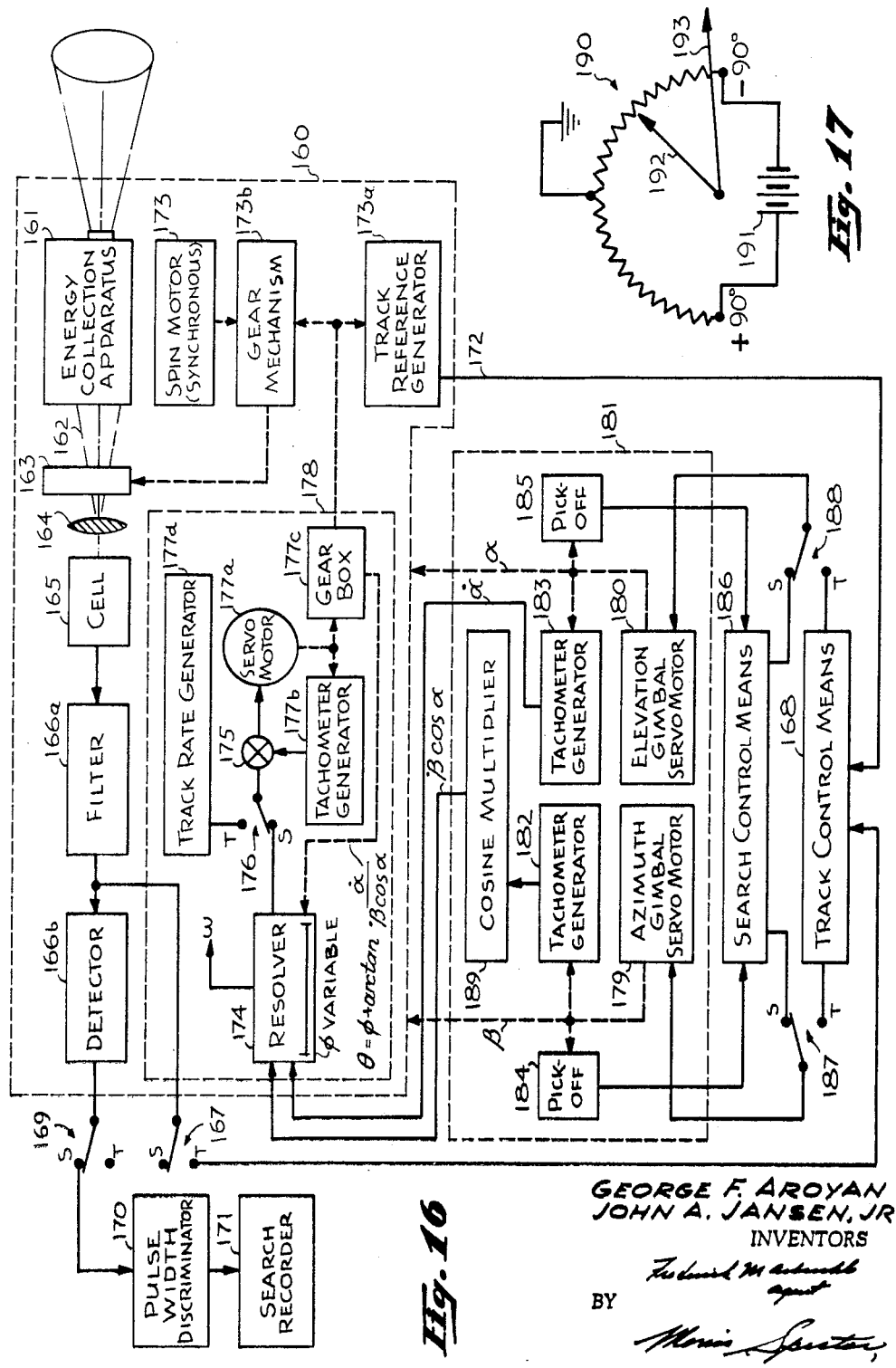

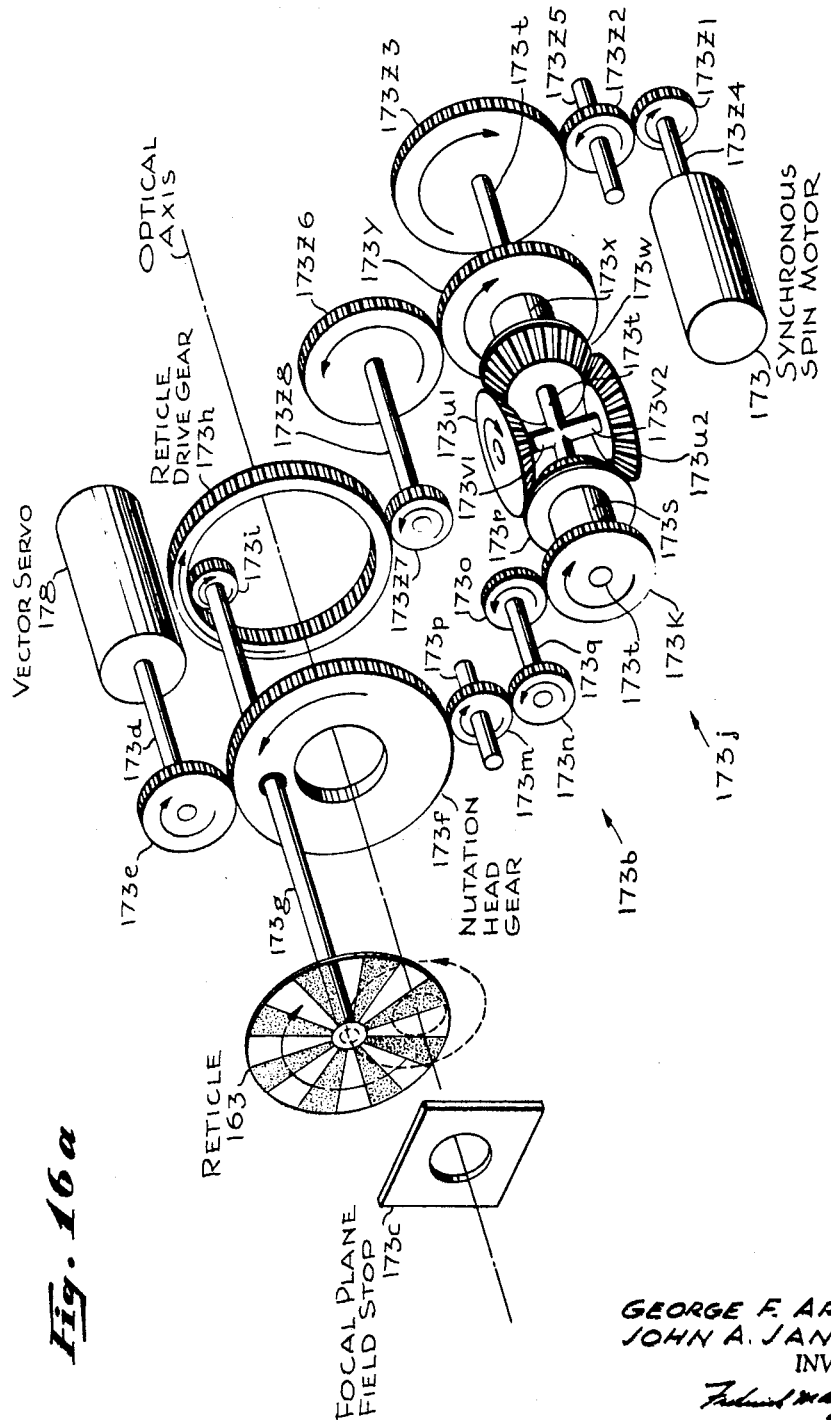

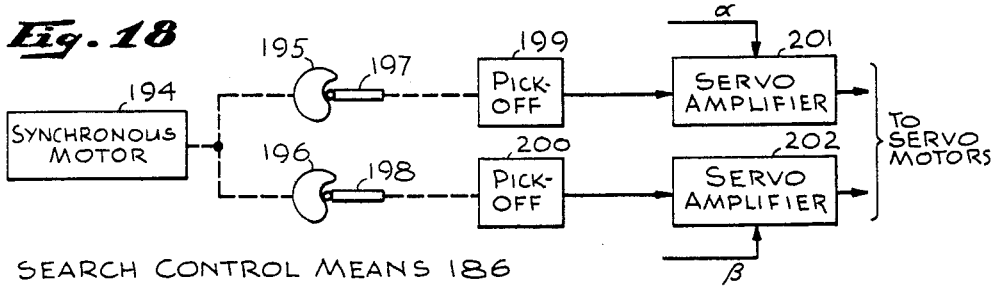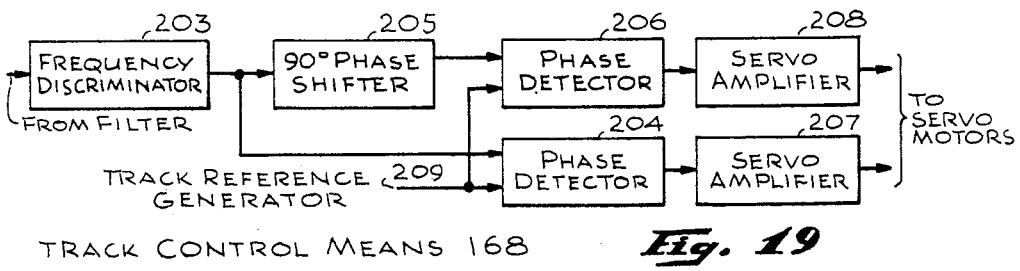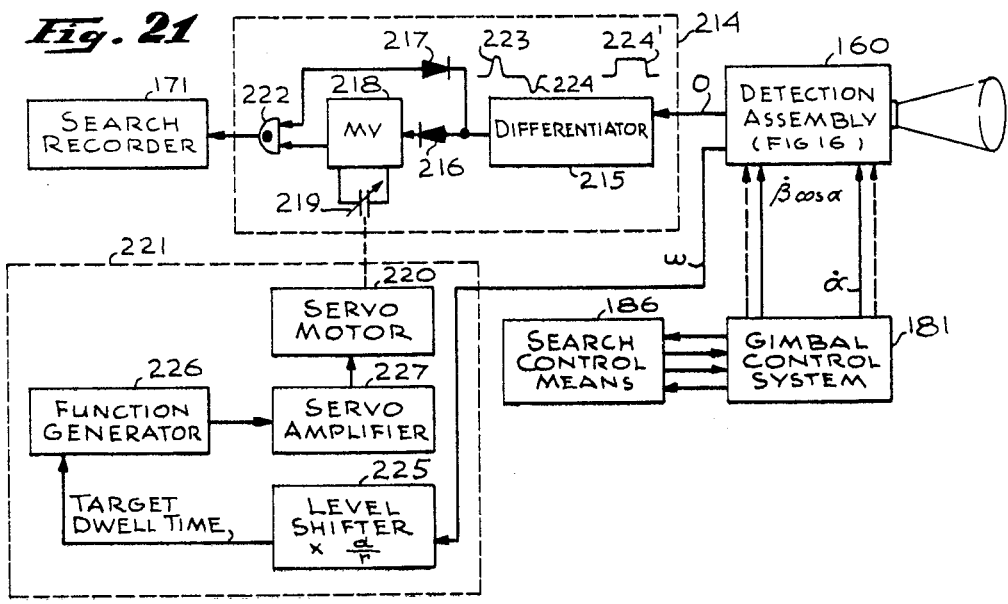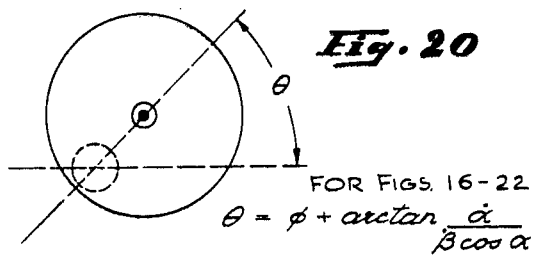

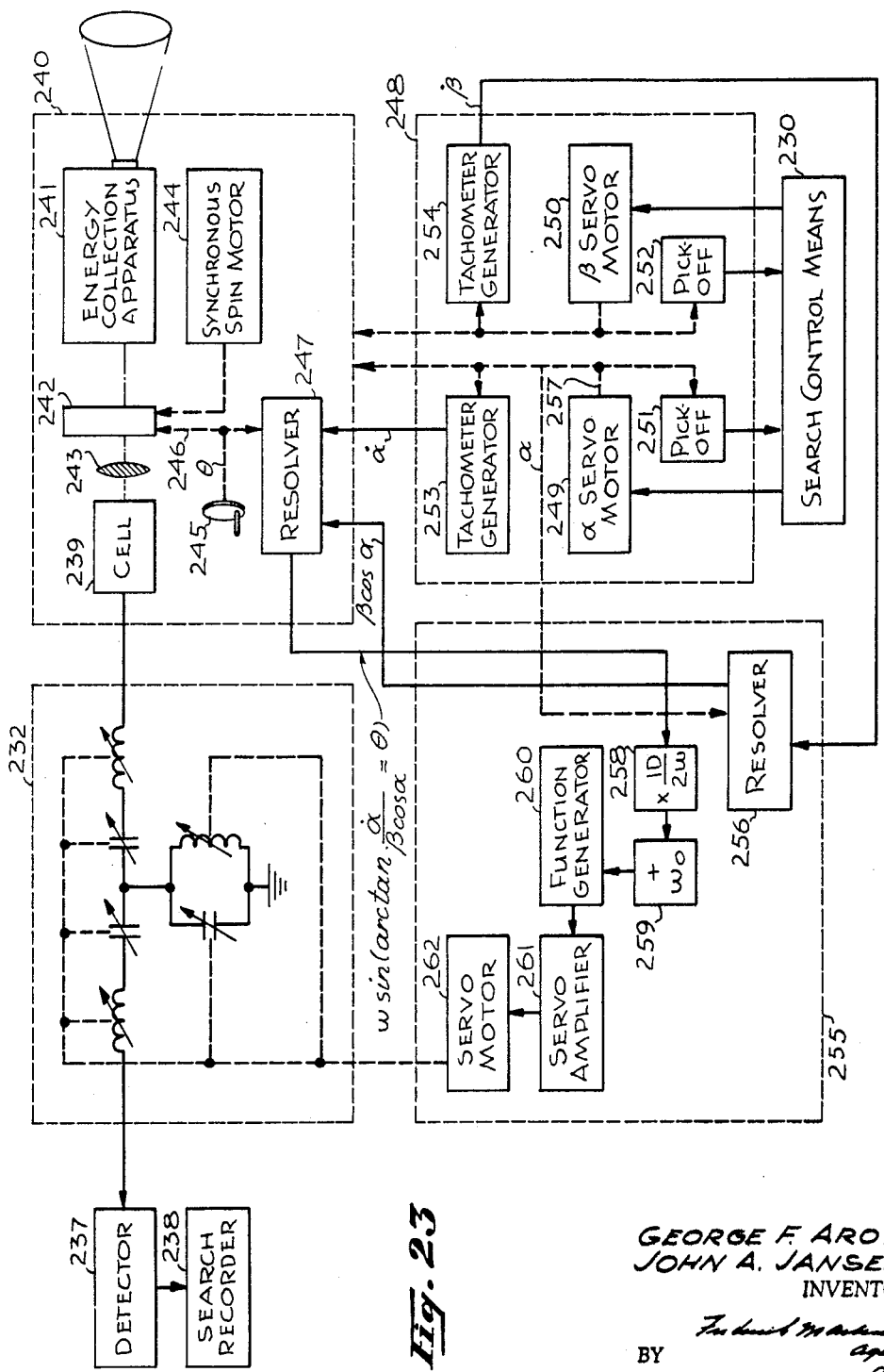

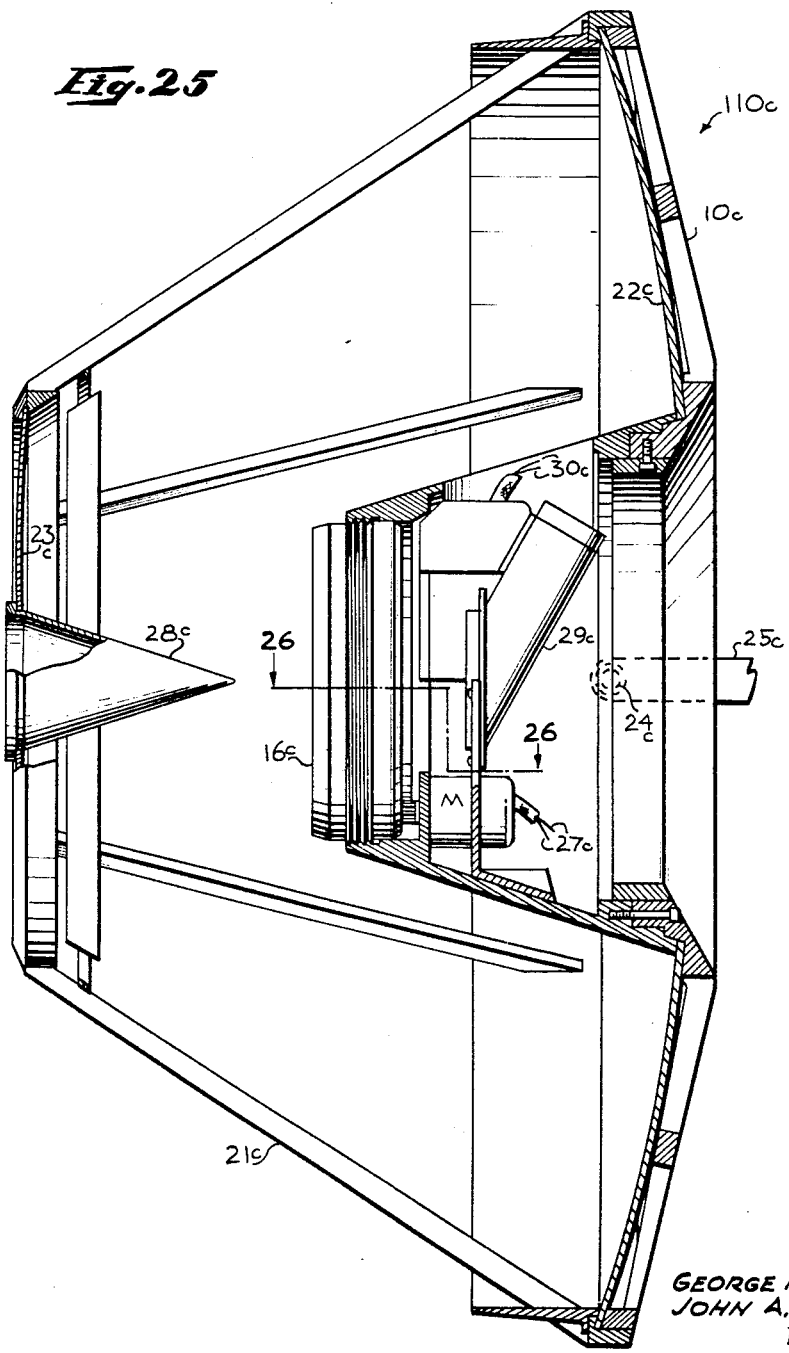

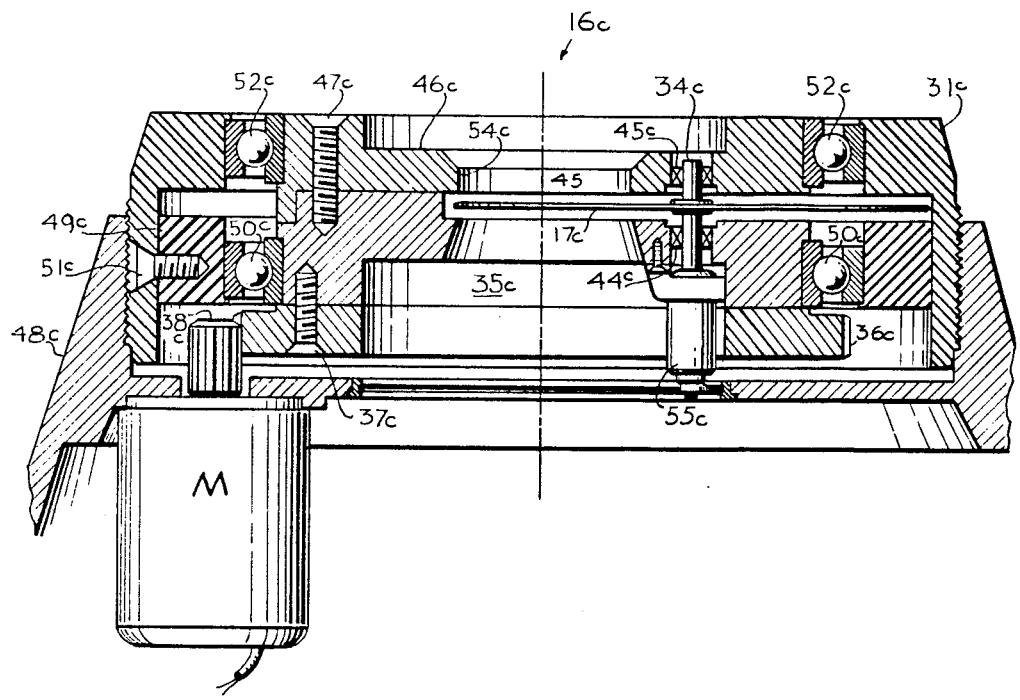

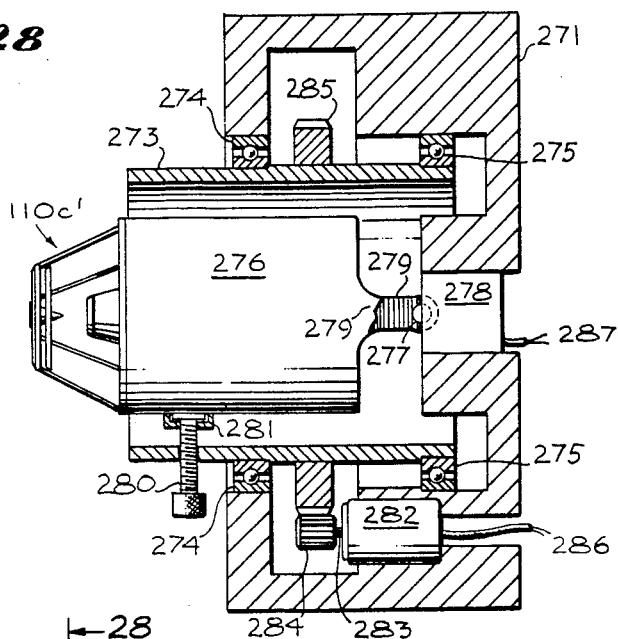
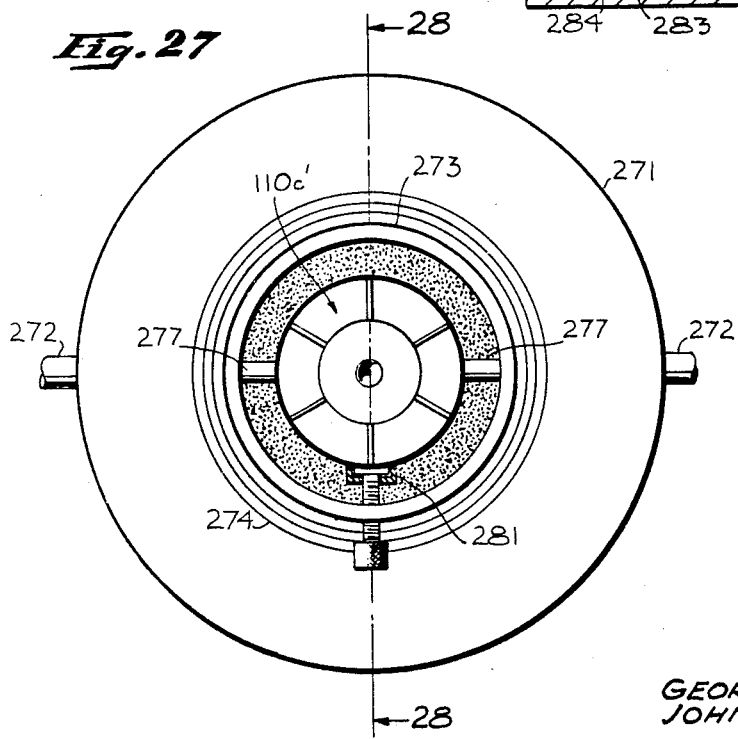

# United States Patent Office 3,230,379
Patented Jan. 18, 1966

3,230,379
OPTICAL SEARCH SYSTEM WITH CONTROLLABLE RETICLE
George F. Aroyan, Manhattan Beach, and John A. Jansen, Jr., Anaheim, Calif., assignors, by mesne assignments, to The Bunker-Ramo Corporation, Stamford, Conn., a corporation of Delaware
Filed Apr. 29, 1959, Ser. No. 809,881
14 Claims. (Cl. 250—234)

This invention relates to improved optical systems, and more particularly to apparatus suitable for use in determining the existence of and/or relative position of, a radiant energy source or reflector and more specifically to improved apparatus and methods in searching for such sources.

In the prior art, numerous systems have been disclosed for detecting and determining the position of bodies from which is emanated some form of detectable energy such as light, heat, or radio-frequency waves. A number of these prior art systems have provided considerable sensitivity and accuracy in their operation. However, especially in the field of visible or infrared target detection, there exists considerable need for improving the sensitivity and response speed of such systems so as to afford more suitable apparatus, by way of example, for detecting or tracking moving bodies or targets such as modern supersonic aircraft and missiles.

Furthermore, there exists a strong need for improving the ability of such detection systems to discriminate between objects representing targets of interest and other objects in the vicinity of such targets which constitute troublesome sources of background "noise" information.

As will appear hereinafter, although the present invention finds particularly useful application to detection systems responsive to infrared radiation, the novel features thereof are also of advantage in radiant energy detection systems based upon the detection of radio waves and visible and invisible light rays. To this end the term "optical," often employed as descriptive of visible light processing systems, will, as used in this specification, be construed as being also descriptive of systems for collecting, directing, refracting, transducing and detecting radiant energy other than that constituting visible light. Likewise, where hereinafter examples of operating principles underlying the prior art and the improvements thereover offered by the present invention may be given in terms of a specific form of radiant energy, such as infrared, such principles will be understood to have potential usefulness in systems responsive to certain other specific forms of radiant energy.

In most prior-art optical systems employed for detecting and determining the position of a target, the space in which it is suspected that an energy-emanating target may be present is systematically examined by an optical type energy collection apparatus. The energy collection apparatus, generally employing combinations of mirrors and/or lenses, is designed to be responsive on a selective basis to only that energy which is collected within a given angular field of view so that the collection apparatus may be regarded as having a response pattern generally representable as a solid cone extending into space, with the apex of the cone positioned at a given point of observation. This angular field of view, or response pattern, is generally referred to as the "instantaneous field of view" or sometimes "field of view" of the collection apparatus and is defined by the size of the "field stop" characterizing the collection apparatus itself. The "field stop" size of such collection apparatus is generally determined either by a diaphragm restriction in the optical path within the apparatus or by inherent characteristics of the lenses or mirrors used. The optical axis of the collection apparatus, as projected into space, is in most cases centrally disposed within this instantaneous field of view so that the optical axis of the energy collection apparatus is in geometric coincidence with the axis of the conical response pattern of the apparatus. The energy collected within the instantaneous field of view is directed to an energy-sensitive cell which develops an electrical potential or signal, the magnitude of which represents the intensity of the total radiant energy collected within the field of view which includes energy, such as may fall in the infrared spectrum, emanating from the target per se as well as background radiation such as sky, clouds, water, etc., against which the target may appear.

However, in accordance with the prior-art technique, it is common to find that a circular disc-like chopping reticle is positioned within the energy collection apparatus at an image or focal plane thereof. Such a reticle is rotated about its axis in interrupting relation to radiation collected by the apparatus to "chop" the radiation as it is directed to the sensitive cell. This type of reticle is generally called a "chopping" reticle because it is comprised of a pattern of carefully dimensioned alternating areas of relative opacity and transmissivity to the energy collected by the apparatus. These areas often have the shape of sectors of a circle. The areas of transmissivity, defined between any two areas of relative opacity on the reticle, are sometimes called "reticle apertures." It has been the practice to align the rotational axis of the reticle with the optical axis of the collection apparatus, at an image plane therein, so as to focus or image the field of view on the reticle. The field of view, as imaged on the reticle, is generally circular in shape and is defined in size by the aforementioned field stop of the apparatus. The diameter of the reticle has in the past been made large enough to embrace the entire imaged field of view to thus interfere with all energy or radiant energy power reaching the cell.

In prior art systems incorporating such chopping reticles, the reticle is rotated about its axis at a selected angular velocity. As it rotates, the reticle apertures move within the imaged field of view and modulate the energy reaching the energy-sensitive cell. The cell then produces an output signal having a direct-current component proportional to the average illumination thereof and generally a plurality of alternating-current harmonically related modulation components, the largest and fundamental alternating-current component having a frequency termed the "chopping frequency" of the reticle. This fundamental alternating-current component is sometimes called the "carrier" component of the cell's output signal. The magnitude or percentage modulation imposed on energy radiated from targets or objects in the imaged field of view by such a reticle, and hence the amplitude of the corresponding fundamental alternating-current signal or carrier produced by the cell, will be a maximum only for targets whose images on the reticle have the same order of dimension as the reticle apertures themselves as taken in the direction of reticle aperture motion. Only a relatively small portion of the energy radiating from larger objects will be modulated by the reticle chopping action.

Due to the fact that energy radiating from targets of less than a predetermined size are modulated to a greater extent than larger ones, a chopping reticle and cell combinations thus effectively discriminate against targets of larger sizes in favor of those smaller than a certain predetermined size. In other words, it exhibits a certain size selectivity just as an electrical filter exhibits a certain time-frequency selectivity. Analogously then, the object size discriminating effect of a chopping recticle is sometimes called "space filtering" because the maximum contribution to the fundamental alternating-current component of the cell output-signal is restricted, by a chopping reticle, to energy emanating from objects or targets of less than a predetermined size. To achieve maximum detection distance or range at which targets may be reliably detected in such a target detecting system, it is sometimes desirable to make the width of the reticle aperture substantially equal to the blur circle of the optical system. The "blur" circle of the optical system is the minimum size to which a point target can be focused or resolved on the reticle due to inherent aberrations and distortions in the mirror and lens elements of the optical system. Under such practical conditions then, the reticle and cell combination tends to provide an over-all detection action yielding maximum carrier generation only for objects whose image sizes are substantially the same as the blur circle of the energy collection apparatus.

In practice, target "surveillance," that is the detection of, position determination of, and the following of a given moving target with apparatus employing a chopping reticle is accomplished in two steps, usually termed "search" and "track," respectively. First, in search the entire collection apparatus is mechanically driven to execute a systematic scanning action which results in the exploratory examination of a volume of space which is many times greater than the instantaneous field of view subtended by the collection apparatus and in which volume of space it is suspected that an energy radiating target may be present. The output of the energy-sensitive cell is oftentimes recorded or stored, on a memory basis, as the search action proceeds, so that during or after completion of the search cycle the apparatus may be automatically returned to one or more selected positions corresponding to the orientations of the apparatus, at those specific instances within the period of the searching cycle, at which target energy has been detected. After redirection of the apparatus so that its field of view embraces that general volume in space in which a specific target has been detected, the second or "track" step of the position determining process is initiated, namely, that of determining the position of the target with respect to the optical axis of the energy collection apparatus and following any change in this position. This determination has in some instances been carried out by causing the optical axis of the collection apparatus to cyclically move or "nutate" around a circular path in space which embraces the target.

More specifically, in one form of tracking system, during nutation, the optical axis of the energy collection system, as projected into space, is moved around a closed loop or path defined on a spherical surface in space. This path is so positioned and restricted in size as to afford pick-up of energy from the target during the movement of the instantaneous field of view. When such is the case, a frequency modulation will be imposed on the carrier component of cell's output signal. By comparing the phase of this frequency modulation with a reference signal having a phase representing the instantaneous position of the optical axis (with respect to a point on a reference line in space) as it is nutated, the polar angle coordinate of the target may be ascertained. Similarly, the magnitude of the frequency modulation imposed on this carrier component will be a measure of the polar radius coordinate of the target in the imaged field of view. From this information, a servo control system may be brought into action to track or follow any target motion.

In accomplishing the tracking phase of target surveillance, there has been recently developed an improved not too generally known form of detection apparatus which so employs a chopping reticle as to afford a more accurate and reliable tracking action than systems prior thereto. Whereas, in earlier systems the axis of the spinning chopping reticle was oriented in coincidence with the optical axis of the energy collection apparatus, in this more recently developed system, the reticle axis is effectively displaced or "offset" from the optical axis of the collection apparatus. The extent of this offset is such that the imaged field of view, in its entirety, is positioned between the reticle axis and the periphery of the reticle. If the reticle is made sufficiently large relative to the field of view, and the field of view is further positioned near the periphery of the reticle, all reticle apertures intercepting and moving across the field of view, at any given instant, will be moving in substantially the same direction. This arrangement, shown in more detail hereinafter, affords significant advantages in accurately tracking a given target once it has been detected.

However, such a system employing this "offset" reticle arrangement has been found to be disadvantageous in detecting a target during the search phase of target surveillance. Again, as will be more fully brought out hereinafter, this disadvantage flows from a reduction in the ability of the overall system to distinguish between point targets of interest and random background content constituting the environment of the target. Also, in the offset reticle arrangement, a disadvantageous "Doppler" shift in the carrier frequency developed by the energy-sensitive cell is sometimes experienced when the direction in which the field of view is moving for search purposes has a vector component parallel to the general direction in which the reticle apertures move across the imaged field of view.

Moreover, in such an offset system, the magnitude of this Doppler shift produced in the carrier may embrace a substantial range of frequencies since, in accordance with the Doppler frequency shift theory, the carrier frequency will be effectively increased when the scanning motion of the field of view is in a direction opposite to the direction of reticle aperture motion across the field of view and will be decreased when the scan motion is in the same direction as the reticle aperture motion across the field of view. This Doppler shift is generally undesirable since the band-pass characteristics of the signal transducing channel following the cell must be made wide enough to embrace a range of frequencies sufficiently large to insure acceptance of the instantaneous carrier frequency. This requirement of a wider band-pass characteristic naturally reduces the signal-to-noise characteristic of the overall system.

It is one of the purposes of the present invention to provide means of so controlling the parameters of such an offset reticle target detection system as to overcome the above mentioned Doppler shift problem to render it adaptable to improved target detection action during the search phase of target surveillance.

Furthermore, in accordance with the present invention, the inter-coordination of various operating parameters of an offset reticle system to adapt the same for successful use in the search phase of target surveillance provides a system of optical target surveillance which permits the realization of a unitary energy collection apparatus which has all of the advantages of the offset reticle system during tracking operation while having a search ability so controllable in its characteristics as to permit optimization of the search characteristics under a variety of different target background environments.

In carrying out the present invention, the present invention provides means for developing information as to the vector relationship between the motion imparted to the field of view during the search phase of target surveillance and the motion of the reticle apertures as they chop the imaged field of view. The present invention then provides means for controlling various parameters of the overall detection apparatus in accordance with this information.

For example, the present invention contemplates so controlling the characteristics of the signal transducing channel following the energy detection cell that the above described undesired Doppler frequency shifts in the carrier are compensated within the signal transducing channel itself.

The present invention further contemplates so controlling the vector velocity relationship between reticle motion and scan motion as to prevent, if so desired, the development of Doppler frequency shift in the carrier.

The present invention further contemplates not only controlling the relationship between reticle velocity and scan velocity to prevent the development of Doppler shift in the carrier but additionally controlling the signal transducing channel following the energy detection cell in accordance with scan velocity information to optimize the response characteristics of the signal transducing channel in accordance with the length of time that an object stays within the field of view during the search phase of target surveillance.

The present invention further contemplates modifying the signal carrier produced by the energy detection cell in accordance with the known relation between reticle velocity and scan velocity so that a given signal transducing channel having fixed characteristics may be advantageously used under a variety of operating environments.

The present invention further contemplates the provision of means for controlling the relationship, at any given instant during the search phase of target surveillance, between reticle velocity and scan velocity to optimize the over-all detection apparatus for use under particular target background environments.

More generally, the present invention embraces an energy collection system for use in target detection in which a plurality of functionally related operating parameters are rendered controllably variable with respect to one another, with means for controlling one or more parameters in accordance with variations in one or more other parameters to optimize the over-all characteristics of the collection system for a number of specifically different operating environments. By such an arrangement, a unitary energy detection apparatus of a chopping reticle variety, may be used for either the search or track phase of target surveillance with the performance of the apparatus in either phase of target surveillance being superior to other well known forms of devices falling in this general class of target detection apparatuses.

Other advantages of the invention will be better understood when considered in connection with the following description especially when read in combination with the accompanied drawings which are to be regarded as merely illustrative.

FIG. 1 is a diagrammatic view of a reticle having one transparent area therethrough adapted to pass over a circular imaged field of view;

FIG. 2 is a graph of the radiant energy power which may pass through the transparent area during movement of the reticle shown in FIG. 1;

FIG. 3 is a graph of two Fourier transforms of portions of the curves shown in FIG. 2;

FIG. 4 is a diagrammatic view of one type of reticle which may be employed with the invention;

FIG. 5 is a plan view of a conventional spoke-type reticle on which an imaged field of view is located;

FIG. 6 is a diagrammatic view of apparatus which may be employed to perform the method of the invention;

FIG. 7 is a schematic diagram of movement of an instantaneous field in a search operation which may be performed by the apparatus shown in FIG. 6;

FIG. 8 is a graph of a group of waveforms characteristic of the output of apparatus shown in FIG. 6;

FIG. 9 is a block diagram of an arrangement for transducing the signal waveform of FIG. 8 to develop a target indicating signal;

FIG. 10 is a front elevational view of a disc type spoked reticle with the position of an imaged field of view indicated thereon in a position to perform searching operations in accordance with the present invention;

FIG. 11 is a diagrammatic view of a rectangularly apertured reticle intercepting a circular imaged field of view to perform analysis of the field of view in a manner comparable to the disc reticle of FIG. 10;

FIG. 12 is a graph of a group of waveforms characteristic of the operation of the apparatus shown in FIG. 6 when the mode of scanning is as illustrated in FIG. 7;

FIG. 16 is a block diagram of one specific embodiment of the invention;

FIG. 16a is a persepctive view of a mechanical drive for a reticle shown in FIG. 16;

FIG. 17 is a schematic diagram of pick-off shown in FIG. 16;

FIG. 18 is a diagrammatic view of search control means shown in FIG. 16;

FIG. 19 is a block diagram of track control means shown in FIG. 16;

FIG. 20 is a diagrammatic view of a reticle with an image field of view illustrated thereon;

FIGS. 21, 22, 23 and 24 are block diagrams of still other embodiments of the invention;

FIG. 25 is a sectional view of radiant energy collection apparatus which may be employed with the invention;

FIG. 26 is a sectional view of a reticle assembly taken on the line 26—26 shown in FIG. 25;

FIG. 27 is a front elevational view of apparatus to be supported in gimbals with which the invention may be practiced; and FIG. 28 is a sectional view of the apparatus taken on the line 28—28 shown in FIG. 27.

Figure 13:
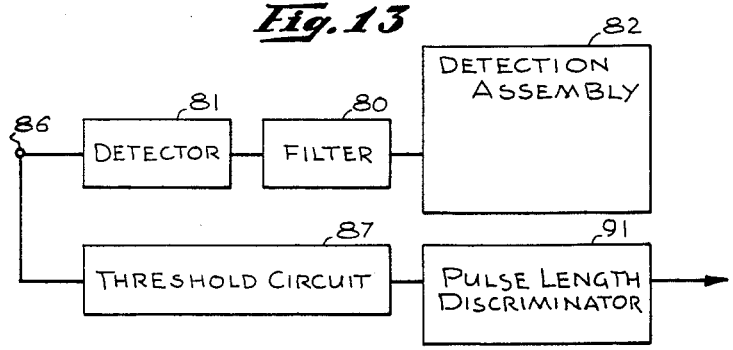
FIG. 13 is a block diagram representation of signal processing apparatus useful in the practice of the present invention.

To better understand the present invention and typical operating environments therefor, some consideration will first be given to several fundamental aspects of optical type target detection systems embodying chopping reticles.

*Intensity analysis of optical images*

For example, in the drawing of FIG. 1, a reticle 50 having only a single rectangular slot 51 is shown disposed in a position to move horizontally across a circular imaged field of view 52 containing therein clouds 53, a horizon line 54, ground 55 having a roadway 56 thereon, buildings 57 on the horizon 54 with trees 58. Also shown by way of example in FIG. 1, within the imaged field of view 52, is a moving airplane 59.

In the instant case, it will be assumed that it is the airplane 59 which is to be detected, its position determined, and its movement tracked.

Reticle 50 shown in FIG. 1 is constructed of a sheet material relatively opaque to radiant energy. However, in the sheet, a rectangular aperture 51 of width "$w$" is provided which is relatively transparent to radiant energy. The total illumination power P in watts, passing through aperture 51 as reticle 50 is moved from left to right, in the direction of arrow V, over the imaged field of view 52, may be graphed as a function of the distance aperture 51 has moved from its initial rest position $d_0$. Such a graph is indicated by line 60 in FIG. 2. In FIG. 2, the rising portion 61 of solid line curve 60 is shown to indicate that portion of the function which would be produced in response to the airplane 59 appearing in the imaged field of view 52, as shown in FIG. 1.

The relatively flat dotted line portion 61' of the function depicted by curve 60 is illustrated for purposes of comparison, to indicate the appearance of the function when airplane 59 does not exist in imaged field of view 52. A comparative analysis of curve 60 inclusive of either portion 61 or 61' may be made by what is known as the Fourier transform. The symbol $d$ represents the distance aperture 51 has moved from its initial position $d_0$ shown in FIG. 1. The symbol $d_{10}$ corresponds to a position at which the aperture has completely passed through the imaged field of view 52. The distance $d_{10} - d_0 = L + W$, L being the diameter of circular imaged field of view 52 and W being the width of aperture 51.

*Space frequency description of objects*

The Fourier transform of the power distance functions shown in FIG. 2 appears substantially as shown in FIG. 3. In considering the transforms of FIG. 3, it is helpful to note that it is common practice, in electrical signal analysis, to express a power versus time function in terms of a power distribution of electrical signal frequencies. For example, if the time varying power demands of some electrical load circuit were to be represented by an electrical signal wave form, this signal wave form, by Fourier analysis, can be expressed or transformed into an expression depicting the power amplitude relationships between a plurality of electrical signal frequencies. That is, a power versus time function is transformed into an equivalent expression of power versus time-rate-of-power change. By study of such a Fourier analysis or transform, it can be determined at what signal frequency or frequencies the largest amount of electrical power is represented. Likewise, in connection with the power versus distance functions of FIG. 2, Fourier transformation of these functions will result in an expression of power versus distance rate-of-power-change. Just as the time rate-of-power-change employed in electrical signal analysis is expressed in cycles of power change per unit time (time frequency or cycles per second), so distance-rate-of-power-change in image brightness analysis may be expressed in cycles of brightness change per unit distance (distance frequency). The concept of the frequency, with which the power passing through a reticle aperture changes per unit distance of aperture displacement, gives rise to the phrase "space frequency." Thus, any image of an object may be described in terms of the amplitude relation between a plurality of space frequencies. It follows then that when an imaged field of view such as indicated in FIG. 1 contains relatively small objects, such as the aircraft 59, the power versus space frequency description of this field of view will indicate substantial power at higher space frequencies. On the other hand, the space frequency description of a field of view of the size shown in FIG. 1, but containing only an image of blue sky, would indicate relatively less power at these higher values of space frequency.

With the above in mind, the transform $61_t$ of FIG. 3, describing the space frequency content of the field of view in the presence of a target, shows that at higher values of space frequencies a considerable amount of power is represented. Contrariwise, transform $61'_t$, describing the imaged field of view in the absence of the target 59, represents considerably less power at these higher frequencies. The difference between the transform $61_t$ and $61'_t$, of course, represents the power versus space frequency description of the target 59. This description is indicated by line 62. Moreover, the space frequency description of the field of view shown in FIG. 3, with, and without the target 59 present, includes the effect of the reticle aperture in scanning the finite imaged field of view as an object itself. It will be remembered that the shape of the imaged field of view is defined by the aperture characterizing the energy collection apparatus. That is, the circular imaged field of view as a whole has some value of average brightness. Thus, the reticle aperture, in passing over the imaged field of view, transmits power changes representative of an object having the size of the imaged field of view itself. This is represented in FIG. 2 by the fact at positions $d_0$ and $d_{10}$, zero energy is passed by the reticle aperture. Because of the zero intensity at positions $d_0$ and $d_{10}$ the Fourier transform of the power versus distance function of 61' in FIG. 2, as represented at $61'_t$ in FIG. 3 (the background alone), will have nulls $n_1$, $n_2$ ... $n_8$, etc. These nulls correspond to space frequencies at which the average intensity of the background, as limited or shaped by the aperture defining the circular field of view, contributes no energy.

*Reenforcement of specific values of space frequencies*

Turning now to FIG. 4, there is illustrated symbolically, a theoretical reticle 63 comprised of an infinite number of reticle apertures 64. Like edges of the apertures 64 are spaced from one another by a given distance A. If the variations in the total power passing through the reticle 63 over the entire imaged field of view is examined while the reticle is moved across the field of view, it will be found that the peak to peak amplitude of such variations will be maximum in response to substantially only those image intensity gradients or objects whose effective dimensions, in the direction in which the reticle is moved, is substantially $A/2$. This intensity change represents a periodicity of intensity change, per unit distance, of A or a space frequency of $1/A$. Thus, roughly speaking, the action of such a reticle comprising an infinite number of apertures, is to reinforce a particular value of space frequency. The action of reticle 63 of FIG. 4 is, viewed from a different standpoint, discriminatory in nature. That is, the reticle tends to discriminate against all space frequencies other than $1/A$, and its harmonics.

*Target selection by reticle re-enforcement*

If now, turning to the transforms of FIG. 3, the reticle spacing A of FIG. 4 is such to reinforce a space frequency corresponding to a null or zero of the background transform $61'_t$ the presence or absence of a target such as aircraft 59 in FIG. 1 may be quite effectively determined. Such nulls in the background transform are indicated at $n_1$, $n_2$, $n_3$, $n_4$, $n_5$, $n_6$, $n_7$ ... etc., each null corresponding to a value of space frequency at which substantially no power exists or is contributed by the background content of the field of view. Thus, any power that can be measured through the reticle 52, when so dimensioned as to reinforce a null, must be attributable to an object having dimensions comparable to that of the aircraft 59. The particular background null which the reticle 52 should be constructed to reinforce is not critical. For a transform of the character shown in FIG. 3, however, it is expedient to choose a null defined by those portions of the curve whose slope adjacent to the null is of lesser value. Such nulls are seen to appear at higher values of space frequencies. This reduces the precision with which the reticle aperture spacing must be dimensioned to realize a substantial percentage change in the power it transmits as a function of the presence or absence of the target. However, as the transform of FIG. 3 shows, the amount of power contributed at any given value of space frequency within the field of view tends to decrease as the value of the space frequency is increased. Overall system signal-to-noise considerations, therefore, suggest that a null be selected at some value of space frequency close to the space frequency at which the expected target contributes substantial energy. As a compromise, therefore, between precision with which the reticle construction must be carried out and signal to noise considerations, a null such as $n_4$ in FIG. 3, is by way of example, selected to define that space frequency which the reticle should be designed to reinforce.

Thus, if in FIG. 4, the reticle spacing A is such to reinforce the space frequency $f_s$ (corresponding to the null $n_4$) in FIG. 3, and the power transmitted through the reticle analyzed, it will be found that a substantially greater amplitude of power modulation will be effected by the chopping action of the reticle in the presence of the target 59 than in its absence. This applies, of course, when the target image is substantially of the same dimension as the reticle aperture spacing, namely $A/2$.

The offset reticle system

In the above mentioned preferred form of optical tracking system employing an "offset" circular spoked reticle, it was described that the imaged field of view is focused on the reticle at a position between the axis of the reticle and the periphery of the reticle. This arrangement is depicted in FIG. 5 where the imaged field of view of FIG. 1 is shown by dotted line 52 to be positioned between the axis 67 and the periphery 68 of the reticle 69. The reticle 69 comprises a circularly shaped disc constructed to present alternate sector-like areas 71 and 70, having respectively different degrees of opacity to the energy being detected. By way of example, areas 71 are shown to be more opaque to the transmission of energy than the relatively transparent areas 70. If the reticle 69 is made of a sufficiently large radius relative to the diameter of the imaged field of view 52, the edges of reticle apertures 70 which cross the field of view will be substantially parallel. Therefore, if a spoked-disc reticle such as 69, adapted to be spun about its axis 67, is made large enough with respect to the imaged field of view 52 and the imaged field of view is positioned sufficiently near the periphery of the reticle, the reticle will have a space filtering effect substantially equivalent to the theoretical rectangularly apertured reticle 63 of FIG. 4.

The optical axis of the energy collection system forming the imaged field of view is indicated at 72 in FIG. 5. In such an arrangement, all of the reticle apertures, which at any instant are embraced by the field of view 52 will be moving in substantially the same relative direction with respect to a line connecting the reticle axis 67 and the optical axis 72. This motion may be depicted vectorially by the vector arrow $V_R$. To the extent that the radii defining the reticle apertures diverge, the vector $V_R$ may be considered as representative of the average vector of view. The direction of reticle rotation about its axis 67 is, in turn, indicated by the arrow $V_A$. By way of example, arrow $V_S$ in FIG. 5 is indicative of one possible direction in which the field of view 52 may be scanned in space, during the search phase of target surveillance. This will be discussed more fully hereinafter.

Offset reticle target detection

The manner in which the off-set system of FIG. 5 may be used for target detection during the search phase of target surveillance is shown diagrammatically in FIG. 6.

Here an optical collection apparatus 73, comprising a suitable arrangement of mirrors, lenses, etc., is provided for collecting energy from a given field of view 74. The collection apparatus 73 is adapted to image the field of view 72 at a focal plane 75 indicated by the dotted line connected arrows. In accordance with the off center reticle system being considered, the spoked reticle 69 is positioned at the focal plane 75 so that the field of view embraced by the collection apparatus 73 is imaged on the reticle 69. Spin-drive means 70' is provided for spinning or rotatably driving the reticle 69 about its axis 67. The reticle axis 67 is so displaced from the optical axis 76 of the optical collection apparatus 73 that the imaged field of view, is, in its entirety, as illustrated in FIG. 5, positioned between the periphery of the reticle 69 and its axis 67. An integrating lens 77 is then provided for collecting all energy transmitted by the spinning reticle 69 and directing this energy to an energy-sensitive cell 78. The cell 78 is responsive to energy incident thereon to produce an electrical signal at its output terminal 79, the magnitude of which is a function of the power or intensity of the energy reaching the cell.

Thus, in the arrangement of FIG. 6, the reticle 69, driven by the spin-drive means 70', will cause the reticle apertures 71 (FIG. 5) to chop the energy represented in the imaged field of view in a manner substantially equivalent to the action described in connection with the reticle arrangement of FIG. 4.

At the output terminal of the cell 79, there will then appear a direct current signal component the magnitude of which is representative of the average power transmitted by the reticle 69. However, the signal appearing at terminal 79 will also have an alternating current "carrier" component, the frequency of which is determined by the chopping action of the spinning reticle 69. This frequency, for fixed objects in a stationary field of view, will be directly governed by the angular velocity with which the spin drive means 70' causes the reticle 69 to spin about its axis. In order to filter out unnecessary harmonics from the alternating signal component appearing at terminal 79 a filter 80 is shown, the output of which is connected to an envelope detector 81.

For convenience, those elements of the off center reticle arrangement shown in FIG. 6 which fall within the dotted line rectangle 82 may be considered as a unitary detection assembly. The field of view 74 to which the detection assembly 82 is responsive may be controllably positioned in space by a suitable mechanical drive system indicated by block 83. The drive system 83 is preferably of a character permitting the field of view 74 to be controllably positioned in both azimuth and elevation. Thus, by properly controlling the mechanical drive 83, the field of view 74 may be caused to scan a predetermined volume of space or "optical frame" in search of an object or target.

Searching for a target

The search procedure is illustrated more clearly in FIG. 7 where the field of view 74 is shown to be initially positioned, at a time $t_1$, in the upper left hand corner of a predetermined optical frame. For convenience in description, the leading edge of the field of view is at this position designated by the index $t_1$. This frame is indicated by the dotted line rectangle 84. By proper control of the mechanical drive 83 in FIG. 6, the field of view 74 in FIG. 7 may be made to systematically scan the frame 84. The manner in which this systematic scanning of the frame 84 is undertaken may follow various patterns. By way of example, in FIG. 7, the leading edge of the field of view 74 is, at time $t_1$, positioned as indicated and moved from left to right so that at time $t_{10}$ the field of view 74 is at the right hand extremity of the frame 84. During the interval from the time $t_{10}$ to time $t_{12}$ the field of view is moved downwardly along a curved path P so that its leading edge is at the position shown at time $t_{12}$. Thereafter, the field of view moves from right to left to the position indicated at time $t_{22}$. This systematic pattern of scan, generally indicated by the dotted line 84' (with arrows $V_S$ thereon indicating the vectorial direction of scan velocity), is continued until the entire frame 84 has been examined. Purely by way of example, in the illustration of FIG. 7, the subject matter embraced by the field of view at time $t_{30}$ is shown to correspond to that indicated in FIG. 1. The horizon line 54 of FIG. 1 is, in FIG. 7, shown to a fuller extent, however, and can be seen to be of a length many times greater than that portion of it embraced by the field of view.

Problems attending search action

The problems inherent in the off-center reticle system of FIG. 6 attending its use as a target searching system as illustrated in FIG. 7, may be best understood by reference to the signal wave forms shown in FIGS. 8a and 8b, and also in FIGS. 12a and 12b later to be discussed in connection with the reticle arrangement of FIG. 10. It is with an understanding of these wave forms, and the relationship of the characteristics thereof, to the relationship between the motion of reticle apertures with respect to the motion of the field of view, that the present invention can be most clearly understood.

Before proceeding, it will be noted with reference to FIG. 6 that the vectorial relationship between reticle aperture motion and a given motion of the field of view depends upon the angular positioning of the reticle axis 67 about the optical axis 72 as measured with respect to some reference line. In FIG. 6, such a reference line is indicated at H, in space, and at H' as it appears within the imaged field of view 52. Reference line H may be considered as descriptive of the earth's theoretical horizon, or true horizontal. The off-center field of view will be maintained at a predetermined distance from the axis of the reticle, for any position of the reticle axis around a circular path such as the path designated by dotted line X—the path X being centered about the optical axis 72. The particular position of the axis 67, illustrated in FIG. 6, will be assumed to be along path X and at a point thereon defined by the intersection of path X with a line extending perpendicularly to reference line H' and drawn from the optical axis 72. With the angular rotation of the reticle as shown by arrow $V_A$, it can be seen that the motion of reticle apertures may be defined by a vector $V_R$ parallel to the reference line H in space. If now, the field of view is moved in space in a vector direction $V_S$, the vectorial relation between reticle aperture motion $V_R$ and the field of view motion $V_S$ will be that depicted in FIG. 5 and FIG. 6. That is, the vectors $V_R$ and $V_S$ describing reticle aperture motion and field of view motion respectively, will be in phase. However, should the reticle axis 67 be positioned at point $P_1$ (on path X diametrically opposite to that illustrated), the vectors $V_R$ and $V_S$ will be 180° out of phase with respect to one another. Alternatively, positioning of the reticle axis 67 at either positions $P_2$ or $P_3$ (both positions representing a 90° displacement from $P_1$ along path X) will result in the establishment of a 90° relation between the vectors $V_R$ and $V_S$.

Turning now to FIG. 8 taken in combination with FIGS. 5, 6, and 7, let it be assumed that during the execution of the search pattern indicated in FIG. 7, the position of the reticle axis 67 (in FIG. 6) is fixed with respect to the optical axis 76 at the position illustrated. This fixed position is such that the reticle apertures move in a direction $V_R$ which is substantially parallel to the reference line H in FIG. 6, while the movement of the field of view is, in the most part, also in one of two possible opposite directions both substantially parallel to this reference line. This relationship between the reticle aperture velocity vector $V_R$ and the field of view scan velocity $V_S$ is shown in FIG. 5 for the case where these velocities are in phase. At some time, such as $t_{12}$, the position of the leading edge of the field of view will be coincident with the position indicated as $t_{12}$ in FIG. 7, and the field of view will be moving from right to left as indicated by the arrow on dotted line 84' adjacent this position. At this instant, it will be assumed that the aircraft 59, indicated in FIG. 1, will not have as yet been encountered by the moving field of view. The content of the field of view at that instant will, of course, be in the process of analysis by the rotating reticle 69, and there will be some background content within the imaged field of view having a space frequency description causing a relatively low-amplitude alternating current carrier signal (the fundamental of which corresponds to the chopping frequency of the chopping reticle) to appear at the output terminal 79 of cell 78 in FIG. 6. This is generally indicated by the low-amplitude portion $85_L$ of the alternating current carrier signal depicted at 85 in FIG. 8a. Still at a later time, $t_{26}$, the field of view will have been lowered somewhat and now moving from left to right, although not as yet having encountered the aircraft. The output of the cell will then be relatively low such as the previous level $85_L$.

However, as soon as the leading edge of the field of view encounters the aircraft 59 (such as at a time $t_{28}$), the amplitude of the carrier signal appearing at the output terminal 79, of cell 78, will increase, by a substantial amount, to an amplitude illustratively indicated in FIG. 8a at $85_H$. The amplitude of the carrier 85 rises to the value $85_H$ for reasons hereinabove set forth, namely—the reticle apertures have been so dimensioned as to reinforce a space frequency at which substantial power is contributed by objects whose images have a size substantially corresponding to the imaged size of the aircraft being sought. It is under these conditions that the percentage modulation of the total energy passing through the reticle, by virtue of the chopping action of the moving reticle spokes on the target image, will be maximized.

This increase in the amplitude of the carrier produced by the cell will continue for a duration of time corresponding to the length of time that the target 59 remains within the moving field of view. This has been illustratively shown in FIG. 8 to be for a period of time $t_{28}$ to $t_{31}$, which period is termed the "dwell" period of the object or target within the moving field of view.

The envelope of the carrier modulation indicated in FIG. 8a is derived, as shown in FIG. 6, by means of the combined action of the filter 80 and envelope detector 81. At the output terminal $81_t$ of the detector 81 in FIG. 6, there will appear an alternating current signal of the character shown at 86 in FIG. 8b. Here portion $86_L$ corresponds to the amplitude of the carrier $85_L$ in FIG. 8a, likewise portion $86_H$ corresponds respectively to the carrier at amplitude $85_H$ in FIG. 8a.

The change in the amplitude of the envelope 86 to value $86_H$, upon the field of view occasioning a target, therefore represents a relatively large percentage increase in the value of the detector output signal. Thus, if as shown in FIG. 9, the output terminal $81_t$ of the detector 81 is connected to an amplitude threshold circuit 87, the encounter of the target 59 may be easily detected as a target signal at the output of the threshold circuit. For this purpose, the threshold circuit will be designed to pass only those signal excursions exceeding level 89' in FIG. 8b. (In FIG. 9, the detection assembly 82, mechanical drive means 83, filter 80 and detector 81 in FIG. 9 correspond to like elements in FIG. 6 discussed above.)

Although, as has been indicated, there will be developed at the output of detector 81 a target-indicating pulse whenever the field of view encounters a target, two basic difficulties are inherent in such as detection systems. The first difficulty is concerned with the algebraic value of that vectorial component of reticle aperture velocity which is coincident with the vector describing the scan velocity of the field of view. Such a component produces a Doppler type frequency shift upon the nominal or mean frequency of the developed carrier. More specifically, consider the arrangement of FIG. 6 and the relation of reticle velocity and scan velocity during the time $t_{12}$ to $t_{22}$, FIG. 7. Here the vector velocity $V_S$ of the field of view (moving from right to left) is opposite in direction to the vector velocity of $V_R$ of the reticle apertures. Under these conditions, the effective frequency of the carrier generated by the chopping reticle, in response to a target, will be decreased over that which would be developed were the field of view stationary. On the other hand, if the field of view is scanned in a direction coincident with the reticle aperture velocity $V_R$ (as during time $t_{24}$ to $t_{30}$ in a left to right direction in FIG. 7), the generated carrier will be higher in frequency. This means that the signal transducing circuit following the cell 78 in FIG. 6 must be of a character capable of accepting and processing a relatively wide band of frequencies. The magnitude of this band of frequencies which the signal transducing circuit (including the filter 80, detector 81 and threshold circuit 87, as in FIG. 9) must pass is further seen to be a function of the magnitude of that vectorial component of scan velocity which is coincident with the vectorial motion of the reticle apertures.

This problem appears even more acute when it is considered that the pattern of scan employed in the search phase of target surveillance may not, in the most part, be defined by parallel straight lines as in FIG. 7. In the example of FIG. 7, although a majority of the field of view motion during search is carried along straight line paths indicated by the lines 84′, there are periods of transition between these straight lines where the field of view is moved along curved paths. Such a curved path is shown at P in FIG. 7. Moreover, alternative search patterns may be made up of overlapping paths defined by continuous cycloidal movement of the field of view similar to written patterns of the Palmer practice exercises used in penmanship instruction.

The necessarily wide band width of the signal transducing channel following the cell, in the above case where reticle aperture velocity is parallel to scan velocity, acts to decrease the signal-to-noise ratio characteristic of the overall detection system. As is well known, the wider the band width of a given signal transducing channel the more troublesome becomes noise generated within the circuit as well as wide-band noise which may appear at the output of the signal source driving the channel. Such wideband noise is typical of energy detection cells of the type used in infrared detection systems for example.

The second difficulty attending the detection of targets with a system or detection assembly of the character shown in FIG. 6, specifically when reticle aperture motion and field of view motion are parallel to one another, is that of undesired response to intensity gradients which define lines perpendicular to the direction of scan. Such vertical lines are oftentimes encountered when scanning for a target against a background of vertically extending cloud banks. Since the dwell time within the field of view of such vertically extending lines is the same as that of a target, the false target indicating pulse developed in response to such a line is, in many cases, indistinguishable from a pulse representing a true target.

*The present invention*

In accordance with the present invention, the above difficulties may be substantially fully overcome. In a preferred form of the present invention, the axis of the reticle in FIGURE 6 is so positioned with respect to the optical axis 72 that at least for the majority of the search cycle there exists a 90° relation between the reticle aperture velocity vector $V_R$ and the field of view velocity vector $V_S$. In the arrangement of FIG. 6, this may be accomplished by positioning the reticle axis at either of the points $P_2$ or $P_3$ along dotted line path X. The relationship between the field of view 52 and the reticle 69 and the relation between the reticle aperture velocity $V_R$ and the scan velocity $V_S$ is shown in FIG. 10. This is substantially equivalent to the image analyzing action depicted in the arrangement of FIG. 11 where the imaged field of view 52 is chopped by the downwardly moving reticle 88. In FIG. 11, reticle 88 has a theoretical infinite number of apertures 89 whose lengthwise edges are substantially parallel to the direction of scan indicated by arrow $V_S$ at 90.

The advantages of such a relationship between reticle aperture motion and field of view scan motion will be best understood by again referring to the search pattern depicted in FIG. 7 taken in combination with the carrier and carrier envelope wave forms shown in FIGS. 12a and 12b.

At some time, such as $t_{12}$ (in FIG. 7), the position of the leading edge of the field of view will be coincident with the position indicated as $t_{12}$ in FIG. 7, and the field of view will be moving from right to left as indicated by the arrow on dotted line 84′ adjacent this position. At this instant, the aircraft 59, indicated in FIG. 1, will not have as yet been encountered by the moving field of view. As before, the content of the field of view will be in the process of analysis by the rotating reticle 69. As a result of this, there will be some background content within the imaged field of view having a space frequency description causing a relatively low amplitude alternating current signal to appear at the output terminal 79 of the cell 78 in FIG. 6. This low amplitude carrier is indicated by the low amplitude portion $85'_L$ of the alternating carrier signal generally depicted at 85′ in FIG. 12. At a later time, $t_{26}$, the field of view will have been lowered somewhat and be in the process of moving from left to right. Although as yet not having encountered the aircraft, the field of view will embrace a portion of the long background line 54 (FIG. 7) defined by the horizon. Here it will be noted that the edges of the reticle apertures are substantially parallel to this long horizontal line so that the intensity gradient produced by this line will be effectively fully chopped by the reticle aperture motion. This accounts for the fact that the amplitude of the carrier 85 rises to a level $85'_{LB}$ as shown in FIG. 12a.

However, as soon as the leading edge of the field of view encounters the aircraft 59 (such as time $t_{28}$), the amplitude of the carrier signal appearing at the output terminal 79, of cell 78, will further increase by a substantial amount, to an amplitude illustratively indicated in FIG. 12a at $85'_H$. This increase in the amplitude of the carrier produced by the cell will continue for a duration of time corresponding to the length of time that the target 59 remains within the moving field of view. This, as defined above, is the dwell period of the object or target within the moving field of view.

The envelope of the carrier modulation indicated in FIG. 12a is shown in FIG. 12b, this envelope appearing, as above described at the output of the detector 81 in FIG. 6. The envelope 86′, in FIG. 12b, is shown to have a portion $86'_L$ corresponding to the amplitude of the carrier $85'_L$ in FIG. 12a. Likewise, portions $86'_{LB}$ and $86'_H$ correspond respectively to the carrier 85′ at amplitudes $85'_{LB}$ and $85'_H$, in FIG. 12a.

Examining the carrier envelope 86′ in FIG. 12b, it will be seen that long background lines such as the horizon which are substantially parallel to the edges of the reticle apertures produce a substantial increase in the output signal level from the detector 81. The change of the envelope 86′ to value $86'_H$ upon the field of view occasioning a target, therefore, represents a relatively smaller percentage increase in the value of detector output signal, than that percentage of increase which is developed in response to long background lines as at $86'_{LB}$. Thus, if as previously indicated in FIG. 9, the output terminal $81_t$ of the detector 81 is connected to an amplitude threshold circuit 87 an erroneous target signal may, as in the arrangement of FIG. 5, again be developed in response to long background lines. However, since in accordance with the present invention, the edges of the reticle apertures are substantially parallel to the direction of the field of view motion, the dwell time of a long background line will be substantially greater than the dwell time of a point target such as aircraft 59. This is indicated in FIG. 12b where the duration of the pulse component $86'_{LB}$ attributable to the long background line is substantially greater than the duration of the pulse component $86'_H$ attributable to the target.

Thus, in accordance with the present invention, the signal transducing arrangement of FIG. 9 may be modified as shown in FIG. 13. Here, the output of threshold circuit 87 is connected to a pulse discriminator circuit 91. If the threshold circuit 87 of FIG. 13 is constructed to pass only input excursions thereto of a predetermined amplitude, as for example indicated by the dotted line 92 in FIG. 12, there will appear at the output of the threshold circuit 87 only signal information representing envelope excursions exceeding the level 92. The pulse length discriminator circuit 91, however, produces an output target indicating signal only in response to pulse wave form information, the duration of which is substantially equal to the dwell time of a point target scanned by the moving field of view. The pulse length discriminator circuit may take a variety of forms, such as for example shown at 214 in FIG. 21 hereinafter. The discriminator circuit 91 then distinguishes between the long duration portion 86′$_{LB}$ of FIG. 12b, attributable to long line background information and the relatively short duration pulse 86′$_H$ attributable to a target falling within the moving field of view.

It will further be seen that, in accordance with the present invention, substantially no erroneous response will be developed upon occasioning vertical or other long background lines transverse to the direction of scan motion since such lines will be transverse to the edges of the reticle apertures. Furthermore, in accordance with the arrangement of the present invention, the Doppler frequency shift, mentioned above, is completely eliminated. This is attributable to the fact that the component of reticle aperture velocity which is coincident with scan velocity, is zero at all times. Accordingly, the filter 80 shown in FIG. 13 may be made extremely sharp, thereby enhancing the signal-to-noise ratio characteristics of the entire detection system.

A further improvement in target detection ability can, in accordance with the present invention be realized by providing means for continuously controlling the position of the reticle axis in accordance with the direction of scan velocity to maintain the above predetermined orthogonal relation between reticle aperture motion and field of view motion. This feature of the present invention is of particular value when the search pattern is of a character having very little straight line construction, as in the above-mentioned Palmer scan type of search pattern such that, during the scan program, the vector magnitude and direction of the scan velocity may vary.

In still another form, the present invention provides means for controlling the characteristics of the pulse length discriminator circuit in accordance with scan velocity information. This is of particular value, where during the search cycle, the scan velocity changes in magnitude. The ability of the system to maintain immunity against long line background information depends upon the pulse discriminator circuit being able to detect the difference between pulse components attributable to the dwell time of a point target within the moving field of view, and the duration of pulse components attributable to lines of length substantially greater than the effective dimension of targets (taken along the direction of scan) to be detected.

The present invention also provides solution of the problem attending a search system in which it becomes impractical because of cost or equipment size considerations to provide means for continuously changing the axis of the reticle with respect to the optical axis of the collection apparatus. In such a case, the present invention contemplates providing means for changing characteristics of the signal transducing channel in accordance with information depicting the vector magnitude and direction of reticle aperture velocity component coincident with the scan velocity component, to optimize the response of the signal transducing channel to the instantaneous value of carrier frequency.

In those cases where there is a preponderance of long background lines substantially parallel to the direction scanned and substantially no long background lines perpendicular to the direction scanned, the present invention contemplates the correction of undesirable Doppler type frequency shift produced when the reticle aperture velocity vector is parallel to search velocity vector by controlling the spin velocity of the reticle as a function of search velocity.

To provide an overall detection system capable of providing optimum detection ability under a variety of different background conditions, the present invention further contemplates the provision of means for controlling both the magnitude and direction of aperture vector velocity with respect to the vector describing the scan velocity of the field of view during the search phase of target surveillance.

Figure 14:
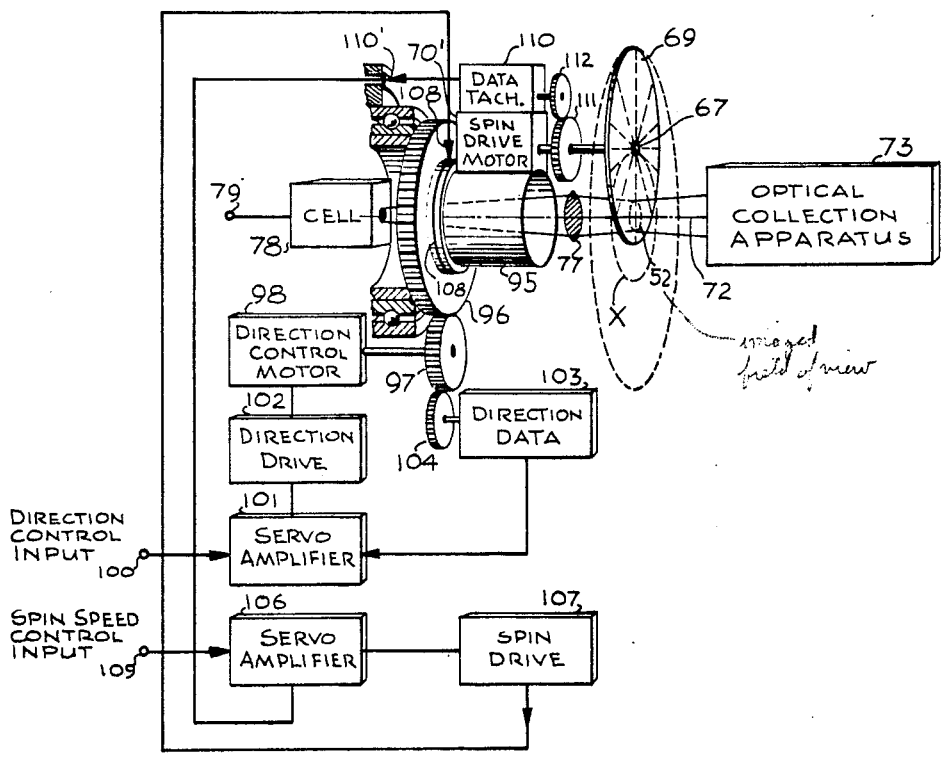
FIG. 14 is a combination block and diagrammatic representation of novel apparatus and control system arrangements useful in the practice of the present invention.

By way of example, a preferred form of the present invention is diagrammatically illustrated in FIG. 14. Basically, the arrangement shown in FIG. 14 is substantially the same as that shown in FIG. 6, and to the extent of the similarity, like elements have been given the same reference numbers in both figures. As in the arrangement of FIG. 6, an optical collection apparatus 73 having an optical axis 72 images a field of view upon the reticle 69, the image field of view being indicated at 52. As in the arrangement of FIG. 6, an integrating lens element 77 collects energy transmitted by the reticle 69 and directs this energy to a sensitive cell 78. The output terminal of the cell is designated at 79. The reticle 69 is adapted to be spun about its axis 67 by means of a spin drive motor 70′.

However, in FIG. 14, in accordance with the present invention, the spin drive motor 70′, whose shaft is connected to the axis of reticle 69, is adapted to be driven in a circular path around the optical axis 72. To this end, the spin drive motor 70′ is mounted on a tubular member 95 to which is attached a drive gear 96. An actuating gear 97, attached to the shaft of a direction control motor 98, engages the drive gear 96 so as to permit the spin drive motor 70′ and, hence the axis 67 of the reticle, to be positioned at any point along the dotted line path X. As brought out hereinabove, the position of the reticle axis 67 around path X controls the vector direction of reticle aperture movement with respect to a reference line in space — and, thus, provides means for controlling the vector direction of reticle aperture motion with respect to the scan velocity describing the movement of the field of view during the search phase of target surveillance. The position of the reticle axis 67 may be servo controlled in accordance with direction input signal information applied to the input terminal 100 of a servo amplifier 101. The output of the servo amplifier 101 controls the power delivered to the motor 98 through a direction drive circuit 102. Direction feedback information, necessary for the servo control of the reticle aperture direction, is derived from a direction data means 103 mechanically coupled by means of the gear 104 to the actuating gear 97. Thus, by varying the input potential to the direction input terminal 100, the position of the reticle axis 67 may be controllably fixed at any desired point along path X.

In further accordance with the present invention and for purposes which will hereinafter more clearly appear, the angular velocity with which the reticle 69 is spun about its axis 67 may be also controlled by means of a servo amplifier 106 which acts through the spin drive 107 to control the speed of spin drive motor 70′. Output of the spin drive 107 is coupled to the spin drive motor 70′ through a slip ring and brush assembly, whose components are generally indicated by the reference numeral 108. A control signal for establishing the speed of reticle rotation at any given value can then be applied to the input terminal 109 of the servo amplifier 106. Reticle speed data, for feedback to the servo amplifier, is provided from a data tachometer 110 coupled to the spin drive motor 70′ by means of gears 111 and 112.

The arrangement of the present invention shown in FIG. 14 provides a very flexible facility for improving the operation of optical detection systems. As will appear in more detail hereinafter, by proper control of this facility, in accordance with the present invention, taken either singly or in combination with the coordinated simultaneous control of the electrical characteristics of the signal transducing circuit following the energy sensitive cell, a very versatile and effective optical detection apparatus may be realized, the performance characteristics of which may be controllably optimized to yield superior performance in both the search and track phases of target surveillance.

Figure 15:
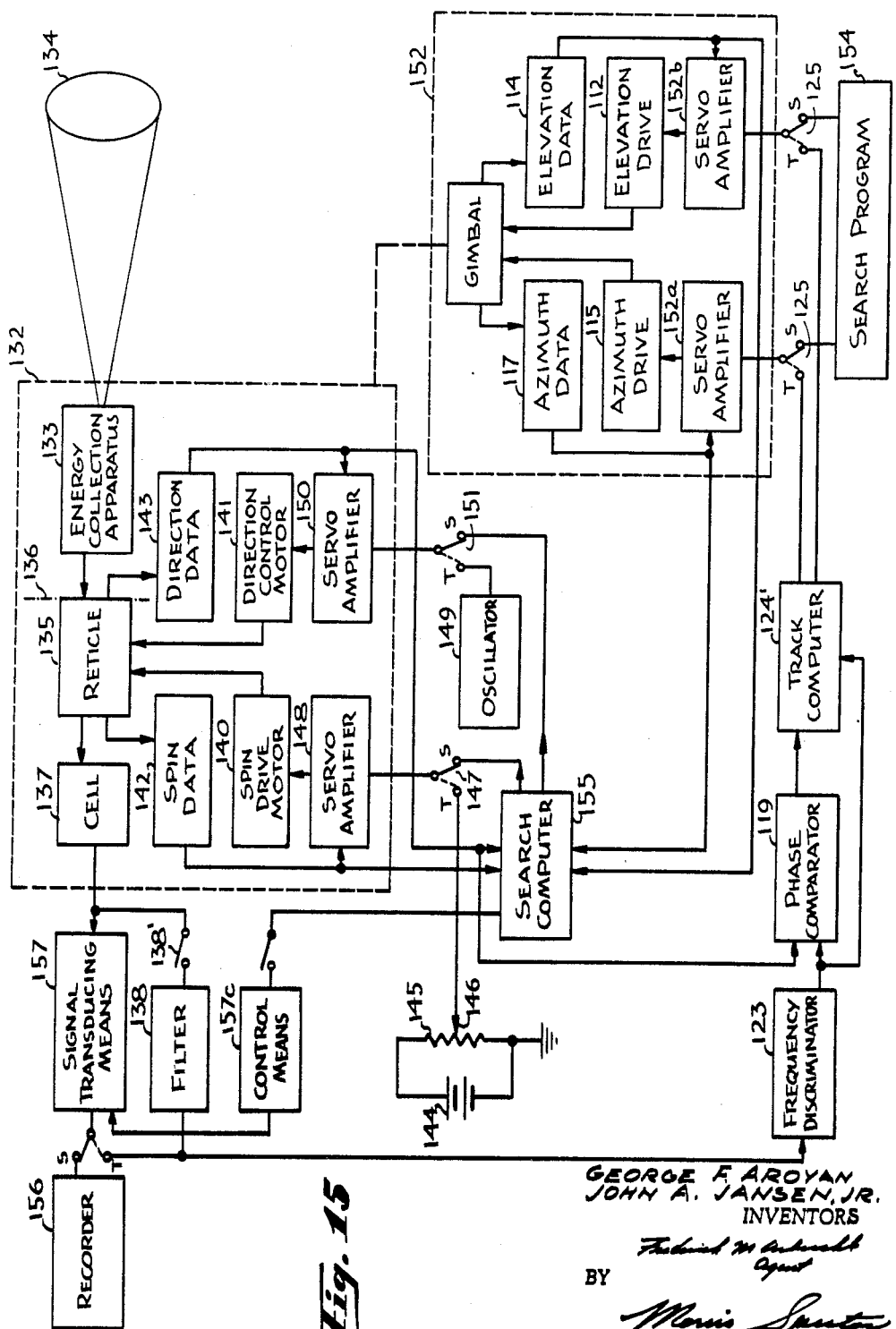
FIG. 15 is a block diagram of one embodiment of the invention.

Before considering in detail many of the novel features in combinations stemming from the present invention, an over-all optical detection system including many features of the present invention will be considered. Such an over-all system is shown in FIG. 15. In FIG. 15, a servo-controlled detection assembly similar to that shown in FIG. 14 is, in part, symbolically represented in block diagram form within the dotted line rectangle 132. Within the dotted line rectangle 132, there is shown a radiant energy collection apparatus 133 for collecting energy within a field of view 134. A reticle 135, positioned at the focal plane 136 of apparatus 133, is also included. Cooperating with the reticle 135 is an energy sensitive cell 137, positioned in back of the reticle. A signal transducing means 157 connected with the output of the cell 137 is provided to process signals developed by the cell. Circuit means 157 may either be a constant or variable pulse width discriminator or a variable band pass filter or a superheterodyne system as will be apparent from the description of other specific embodiments of the invention to be described in detail hereinafter. Alternatively, circuit means 157 may be actually eliminated and filter 138 connected directly between the cell output and a frequency discriminator 123. Switch 138' has been shown for this purpose.

A spin drive motor 140 is provided for reticle 135 and a direction control motor 141 is also provided to control the direction of reticle aperture vector velocity as above described in connection with FIG. 14. Data pick-offs 142 and 143 produce output signals proportional to the spin speed and direction of reticle aperture movement, respectively, within the radiant energy path along which energy is directed by apparatus 133. A battery 144 is connected across a potentiometer 145 having a variable tap 146 which conditionally provides an input signal to the spin speed control servo amplifier 148 during tracking operation. A switch 147 is provided to change the input to the spin speed servo amplifier 148 from the tap 146 of potentiometer 145 to a different input from search computer 155 during search operation.

An input is provided to direction control servo 150 by means of an oscillator 149 during tracking, while during searching, this input is derived from the search computer 155. Whether direction control motor 141 is servo controlled in accordance with a tracking operation mode or searching operation mode is determined by the position of a switch 151. The letters T and S, in the drawings, respectively correspond to the "track" and "search" modes. During searching, inputs are provided to the azimuth and elevation drive servo amplifiers 152a and 152b, serving a gimbal servo control system generally indicated in dotted line area 152, from a search program source 154. During track, servo amplifiers 152a and 152b are provided with signals from a track computer by switches 125a and 125b. Data pick-off 143 provides an input to phase comparator 119 which also is provided with input from frequency discriminator 123. Frequency discriminator 123 is likewise provided with an input from circuit means 157.

During search, elevation and azimuth drives 112 and 115 are controlled by inputs to servo amplifiers 152a and 152b from a search program control means which is indicated at 154. The search program is chosen to cause a field of view 134 to scan a predetermined volume in space, for example, in the manner as indicated in FIG. 7. During search, search computer 155 receives inputs from both data pick-offs 114 and 117 as well as both data pick-offs 142 and 143, to impress input signals on servo amplifiers 148 and 150 for controlling reticle speed and/or the direction of the aperture velocity vector in accordance with search or scan velocity vector information. As mentioned above, during search, a recorder 156 may be connected from the output of transducer 157. The recorded output of transducer 157 then may be compared with the output of the search program determined by means 154 at a later time to determine the existence of and the approximate position of a target in the total surveillance volume scanned.

It is an outstanding feature of the invention that the axis of reticle 135 is offset from the optical axis of radiant energy collection apparatus 133 both during search and track. During track, oscillator 149 may be employed to continuously change the position of the rotational axis of reticle 135 in a planetary fashion relative to and about the optical axis of collection apparatus 133 to cause frequency modulation of the fundamental alternating output signal of cell 137.

The cause of this frequency modulation will become apparent when it is considered that the value of the carrier frequency produced by the chopping action of the reticle apertures depends upon the relative velocity of reticle apertures with respect to the image of a point target within the field of view.

Since the motion of the reticle axis is planetary in nature about the optical axis, any target imaged at the optical axis per se will bear a fixed velocity relation to the reticle apertures. On the other hand, if the image of a point target is displaced from the optical axis by a fixed distance, the planetary motion of the reticle axis will produce an additional mode of relative motion between the target image and the reticle. This mode of relative motion is of a character identical to that which would be produced had the axis of the spinning reticle been fixed with respect to the optical axis and the target image moved around the optical axis in a circular path. In such a case, the angular velocity of the image around its circular path would be equal to that of the angular velocity of reticle axis when moved in planetary fashion around the optical axis. It can then be seen that as a result of this mode of circular motion the target image sometimes moves in the same direction of reticle aperture velocity, sometimes at 90° with respect to it, sometimes opposite to it. When this component of relative motion is in the same direction as reticle aperture velocity, the effective chopping frequency is reduced, when at 90° no change in the chopping rate is produced, while when in the opposite direction, the rate of chopping is increased. The greater the displacement of the target image from the optical axis, the greater the degree of carrier frequency modulation is produced. Further the instantaneous magnitude of frequency modulation will be greatest, in the increased sense, when the reticle axis is so positioned relative to the optical axis that the velocity vector of the reticle aperture is parallel to the velocity vector representing the instantaneous direction of motion imposed on the reticle aperture by virtue of the planetary drive of the reticle axis. This permits the angular position of the target about the optical axis to be determined by measuring the relative phase between the frequency modulation and a signal representing the instantaneous angular position of the reticle axis about the optical axis.

Thus, during tracking operation, the output of the frequency discriminator 123 is compared with the output of data pick-off 143 by phase comparator 119 and the frequency modulation of the carrier is detected by discriminator 123. Inputs are then provided from comparator 119 and discriminator 123 to track computer 124'. Track computer 124' will then operate the gimbal servo system 152 through servo amplifiers 152a and 152b to so control azimuth and elevation drives 115 and 112 to cause detection assembly 132 to follow an airplane or target. The output of data pick-off 143 will be representative of the angular position of the rotational axis of reticle 135 around the optical axis of collection apparatus 133 at any instant. Alternatively, the output of oscillator 149 may be directly connected to phase comparator 119 and data pick-off 143 may be eliminated for the tracking operation. The rotational speed of reticle 135 about its symmetrical axis is not necessarily, but preferably is maintained constant during the tracking operation by means of battery 144 and potentiometer 145.

The operation of the embodiment of the invention shown in FIG. 15 during search is as follows. Search program 154 operates gimbal servo amplifiers 152a and 152b to so control azimuth and elevation drives 115 and 112 to cause radiant energy collection apparatus 133 to scan a predetermined surveillance volume in space. In accordance with this feature of the invention, recorder 156 records the output of transducing circuit means 157. Both the rotational speed of reticle 135 about its symmetrical axis and its angular position around the optical axis of radiant energy collection apparatus 133 are controlled by the output of search computer 155.

Reticle direction and spin speed are controlled as a function of search velocity vector information. To this end, an input to search computer 155 representing search velocity vector information is provided by data pick-offs 114 and 117. Search computer 155 may, as later described, also control transducing means 157 in accordance with search or scan velocity, if desired. Control means 157c has been shown for this purpose. However, it is to be noted that the control of circuit means 157 may be employed exclusive of spin speed control and direction control of reticle 135.

It is an outstanding feature of the invention that reticle aperture vector velocity, search or scan vector velocity or circuit means 157 in FIG. 15 may be controlled as a function of one or both of the other two to provide unusually useful long background line discrimination and/or frequency shift compensation. However, due to the fact that the output of search program means 154 will generally be independently selected, either or both of circuit means 157 and the vector velocity of reticle 135 will be controlled as a function of search or scan vector velocity.

In FIG. 16, a detection assembly 160 is shown including radiant energy collection apparatus 161 to direct radiant energy in a path 162 through a reticle 163 and thence through a lens 164 to a radiant energy sensitive cell 165. The output of cell 165 is impressed upon a filter 166a and, in turn, upon a detector 166b. The output of filter 166a is also connected to a search-track switch 167 alternately to connect and disconnect the output of filter 166a to track control means 168. A search-track switch 169 is connected from the output of detector 166b to a pulse width discriminator 170, the output of detector 166b generally being disconnected from a pulse width discriminator 170 during the tracking operation. The output of pulse width discriminator 170 is connected to a search recorder 171. A track reference generator 173a is also provided which is appropriately mechanically connected to produce an electrical output signal indicative of reticle axis position. This signal has a positive maximum value when the axis of reticle 163 is located in a 180° range above a horizontal plane through the optical axis of energy collection apparatus 161 and a negative maximum value when the axis of reticle 163 is located in a 180° range below said horizontal plane. Alternatively, this signal may be sinusoidal or have a positive maximum value when the axis of reticle 163 is located in a 180° range to the left of a vertical plane through the optical axis of energy collection apparatus 161 and a negative maximum value when the axis of reticle 163 is located to the right of said vertical plane.

In any case this track reference generator output signal is impressed upon track control means 168 via output lead 172.

$\theta$, a variable referred to hereinafter, is defined here for that purpose as the angle between a horizontal reference axis in the plane of the reticle fixed relative to the energy collection apparatus and a second line through the reticle center and through the center of the imaged field of view. A parameter $\phi$, used hereinafter, is defined here as the difference between $\theta$ and arctan $$\frac{\dot{\alpha}}{\dot{\beta} \cos \alpha}$$

which may be changed by a mechanical adjustment, if desired.

If $\phi$ can be changed, it may be set to a value $\phi=0$ to optimize frequency shift compensation or to other values to reduce chopping of background. The latter is true because chopping of background is less when gradients therein are approximately parallel to the spoked-shaped areas on the reticle in the imaged field of view. A synchronous spin motor 173 is employed with a mechanical differential 173b to rotate reticle 163 about its symmetrical axis, but at the same time, during both search and tracking operations. A vector servo 178 is employed to control the position of the center of reticle 163. Vector servo 178 includes a resolver 174 to receive outputs designated $\dot{\alpha}$ and $\dot{\beta} \cos \alpha$ of a gimbal control system 181 where $\alpha$ is defined as the elevation angle of detection assembly 160, $\beta$ is defined as the azimuth angle, $\dot{\alpha}$ is the rate of change of $\alpha$ with respect to time, and $\dot{\beta}$ is the rate of change of $\beta$ with respect to time. Resolver 174 produces an output signal $\omega$ proportional to $$(\dot{\alpha}^2 + \dot{\beta}^2 \cos^2 \alpha)^{1/2}$$

not used in FIG. 16. Another output is impressed on a combining circuit 175 through a search-track switch 176 which is zero when $\phi=0$ and $\theta=$arctan $$\frac{\dot{\alpha}}{\dot{\beta} \cos \alpha}$$

Search-track switch 176 may also be employed to connect a track rate generator 177d to combining circuit 175. Combining circuit 175 drives a servo motor 177a if a difference exists between its input from switch 176 and a tachometer generator 177b which servo motor 177a drives.

Besides driving tachometer generator 177b, servo motor 177a also drives three other mechanisms through a gear box 177c. These three mechanisms are gear mechanism 173b, track reference generator 173a, and the rotor of resolver 174.

The function of vector servo 178 will be better understood when considered with a description of the modes of operation of the embodiment of the invention shown in FIG. 16 to be made hereinafter.

In FIG. 16, detection assembly 160 is moved in a set of gimbals operated by azimuth and elevation gimbal servo motors 179 and 180 shown in gimbal control system at 181. The rates of movement $\dot{\alpha}$ and $\dot{\beta}$ of the output shafts of servo motors 179 and 180 and the angular positions $\alpha$ and $\beta$ thereof are measured and electrical output signals proportional thereto are provided by tachometer generators 182, 183 and pick-offs 184, 185, respectively. Servo motors 179 and 180 are controlled by search control means 186 during the searching operation, the outputs of pick-offs 184 and 185 being impressed on search control means 186. Inputs to servo motors 179 and 180 are provided by track control means 168 during the tracking phase of the invention. Switches from servo motors 179 and 180 are provided at 187 and 188, respectively, to connect search control means 186 during the searching operation and track control means 168 in the tracking operation thereto selectively.

The output of tachometer generator 183 is impressed directly on vector servo 178. A signal, derived from tachometer 182 representing the rate of movement $\dot{\beta}$ of the output shaft of servo motor 179 is impressed upon a cosine multiplier 189 which produces an output signal proportional to $\dot{\beta} \cos \alpha$. The output of cosine multiplier 189 is then impressed upon vector servo 178.

Pick-offs 184 and 185 are old and well known in the art and may be the type shown in FIG. 17 including a potentiometer 190 energized by battery 191, the potentiometer 190 having a wiper 192 to be controlled in accordance with shaft rotation of the output shaft of servo motor 179 and 180. The output of pick-offs 184 and 185 is then taken from the wiper 192 as indicated at an output lead 193.

In the operation of the embodiment of the invention shown in FIG. 16 during searching, search control means 186 causes detection assembly 160 to move by means of the control of servo motors 179 and 180. In this case, pulse width discriminator 170 is constructed to reject pulses of a width longer than the dwell time of a target within the field of view of collection apparatus 161.

Although the output of tachometer generator 183 is impressed upon vector servo 178 to control the position of the reticle axis, it is necessary to resolve the output of tachometer generator 182 to $\dot{\beta}\cos\alpha$ because search vector velocity components to be considered for control are those about a horizontal reference axis and about an axis in the plane of the reticle perpendicular to the horizontal reference axis.

The parameter $\phi$ defined above may be added or subtracted from arctan $$\frac{\dot{\alpha}}{\dot{\beta}\cos\alpha}$$

to control the position of the reticle 163 easily by simply mechanically adjusting the position of the stator of resolver 174.

In the operation of the embodiment of the invention shown in FIG. 16 during search, all switches 167, 169, 176, 187, and 188 are maintained in the position shown. Search control means 186 causes detection assembly 160 to move through a selected search cycle. Movement of detection assembly 160 is detected by tachometer generators 182 and 184 and pick-offs 184 and 185.

Where it is desired to reduce frequency-shift as much as possible, preferably $\phi=0$. Resolver 174 thus maintains the position $\theta$ of the center of reticle 163 equal to arctan $$\frac{\dot{\alpha}}{\dot{\beta}\cos\alpha}$$

This is done by servo motor 177a which continues to drive the reticle 163 through gear box 177c until the resolver 174 output to switch 176 falls to zero. Tachometer generator 177b simply is used rather than a shaft position pick-off so that, during the tracking operation, the track rate generator 177d may be connected to combining circuit 175 to drive motor 177a at a constant speed when the output of track rate generator 177d produces a constant output voltage.

From the foregoing, it will be appreciated that no frequency shift compensation is made for that type produced in tracking due to a finite $\dot{\theta}$, the rate of change of $\theta$ with respect to time, and that no compensation is made for the component of gimbal rotation in the plane of reticle 163. However, due to the fact that vector servo 178 is conveniently maintained in a fixed mechanical position in detection assembly 160 and due to the specific gearing employed, gear mechanism 173b, which effectively operates as a mechanical differential, is employed to prevent a change in reticle spin speed, as distinguished from the angular velocity of its center.

Gear mechanism 173b is shown in FIG. 16a with a focal plane field stop 173c, reticle 163, vector servo 178, and spin motor 173. Vector servo 178 is provided with an output shaft 173d having a pinion 173e fixed thereto to mesh with a nutation head gear 173f. Reticle 163 is fixed to a shaft 173g which is rotatably mounted through nutation head gear 173f. Shaft 173g is rotated as a function of the speed of both nutation head gear 173f and a ring-shaped reticle drive gear 173h. This is true because a pinion 173i is fixed to the right end of shaft 173g, as viewed in FIG. 16a to mesh with reticle drive gear 173h. If all the gears rotate in the direction indicated by the arrows, the spin speed of reticle 163 would be increased beyond the speed normally set by spin motor 173 if it were directly geared to reticle drive gear 170h. For this reason, a conventional miter gear mechanical differential 173j is employed to subtract a rate proportional to the vector servo rate from the output of spin motor 173. Nutation head gear 173f is coupled to an input gear 173k of differential 173j via gears 173m, 173n and 173o. Gear 173m is located on a shaft 173p and gears 173n and 173o are located on a shaft 173q. Input gear 173k is fixed with a miter gear 173r by a collar 173s, gear 173k and 173r with collar 173s all being rotatable on a shift 173t.

Miter gear 173r meshes with two other miter gears 173u1 and 173u2 that are rotatably mounted on corresponding shafts 173v1 and 173v2 which are fixed to shaft 173t. Gears 173u1 and 173u2 then mesh with a miter gear 173w which is fixed to and rotatable with a collar 173x and output gear 173y on shaft 173t.

Shaft 173t is driven in shaft by spin motor 173 through gears 173z1, 173z2 and 173z3 respectively, fixed to shafts 173z4, 173z5 and 173t. Reticle drive gear 173h is then driven by output gear 173y through gears 173z6 and 173z7 fixed to a shaft 173z8.

Differential 173j operates in the conventional manner to subtract a speed proportional to that of shaft 173d from a speed proportional to that of shaft 173z4.

Search control means 186 may be constructed as indicated in FIG. 18 incorporating a synchronous motor 194 to drive a pair of cams 195 and 196, which, in turn, operate followers 197 and 198, respectively. Followers 197 and 198, in turn, operate pick-offs 199 and 200 which produce output signals proportional to the displacement of corresponding followers 197 and 198. Servo amplifiers 201 and 202 then receive the outputs of pick-offs 199 and 200 which are compared to the outputs of pick-offs 185 and 184, respectively, to operate servo motors 180 and 179, respectively. Cams 195 and 196 may be of any desired shape to search in any predetermined pattern.

Track control means 168 may be constructed as indicated in FIG. 19 including a frequency discriminator 203, the output of which is connected both to a phase detector 204 and a phase shifter 205. The output of phase shifter 205 is, in turn, connected to a second phase detector 206. The output of phase detectors 204 and 206 are then impressed upon servo amplifiers 207 and 208. The output of servo amplifiers 207 and 208 are then impressed upon servo motors 180 and 179, respectively. Phase detectors 204 and 206 receive a second alternating input signal on an input lead 209 having a phase proportional to the angular position of the center of reticle 163.

It is to be noted that when $\theta$ is measured as shown in FIG. 20, in FIG. 16 preferably $\phi$ is zero in the case where it is desired to substantially reduce frequency shift. This may be explained another way as maintaining the reticle axis in a position such that it lies on a line through the center of the radiant energy path or optical axis in the scanning direction of the detection assembly 160. However, total scan rate vector magnitude $\omega$ will not necessarily be constant. For this reason, in FIG. 21 preferably a variable pulse width discriminator is used as indicated at 214 connected from the output of detection assembly 160. Pulse width discriminator 214 includes a differentiator 215 having diodes 216 and 217 connected at the output thereof. Diode 216 is, in turn, connected to a monostable multivibrator 218 having a circuit element such as a capacitor 219 variable with the output of a servo motor 220 in discriminator control means 221 to vary the time constant of multivibrator 218. The output of multivibrator 218 controls a gate 222 which passes a negative output signal of diode 217 provided that, after multivibrator 218 has been shocked into its high state, it has not reverted to its low state. The negative output pulse of differentiator 215 is then recorded in search recorder 171.

Variable pulse width discriminator 214 operates as follows. Differentiator 215 differentiates a square pulse 224' at the output of detector 166b (FIG. 16), in detection assembly 160. Pulses indicated at 223 and 224 produced by differentiator 215 at the leading and trailing edge of the input pulse are then separated according to polarity. The leading pulse 223 is employed to trigger multivibrator 218. The pulse 224 is recorded in search recorder 171 provided multivibrator 218 has not reverted to its low state by the time pulse 224 is impressed upon gate 222. The time constant of multivibrator 218 should be adjusted in proportion to the magnitude, $\omega$, of vector scan velocity. This is performed by discriminator control means 221 which receives output signal $\omega$ from detection asembly 160 and shifts the level thereof by means of level shifter 225 which may be an amplifier having a constant multiplication factor proportional to the diameter of the field of view on reticle 163 times the distance between the gimbal center to the center of the imaged field of view on reticle 163. The output level shifter 225 is then proportional to the dwell time of a target in the imaged field of view. The output of level shifter 225 is impressed upon a function generator 226 which is employed simply to match the time constant change of multivibrator 218 with a change in the angular position of the output shaft of servo motor 220. Servo motor 220 is operated by function generator 226 through a servo amplifier 227.

Another embodiment of the invention is shown in FIG. 22 including a detection assembly 228 operated by a gimbal control system 229 through search control means 230. Detection assembly 228 includes radiant energy collection apparatus 263, a reticle 264, a lens 265 and a reticle spin motor 266. The position of the center of the reticle 264 if fixed at $\theta=0$. The output of detection assembly 228 at radiant energy sensitive cell 231 therein is impressed upon both a variable frequency band pass filter 232 and a discriminator 233. Only the frequency position of the pass band and not the width of the pass band of filter 232 is variable by a mechanical connection with a servo motor 234 for varying the reactance of a plurality of impedance elements generally indicated at 235 therein. The output of discriminator 233 will thus be a voltage proportional to the fundamental frequency of the output of cell 231. If this frequency varies, the pass band of filter 232 may be shifted to correspond to the variation whereby the pass band of filter 232 may be relatively narrow to discriminate against noise but shifted to follow the frequency of the fundamental output signal of cell 231. The output of discriminator 233 is impressed upon a function generator 235' which, in turn, controls servo motor 234 through a servo amplifier 236. As before, function generator 235 balances the input to it from discriminator 233 with the frequency shift versus shaft motion of servo motor 234 characteristic of filter 232. As before, the output of filter 232 is impressed upon detector 237 and the output of detector 237 is impressed upon a search recorder 238.

In FIG. 23, means are provided including variable frequency band pass filter 232, detector 237, recorder 238 and a cell 239 in a detector assembly 240 including energy collection apparatus 241, a reticle 242, a lens 243 and a synchornous motor 244 to spin reticle 242 about its symmetrical axis. A hand wheel 245 is provided to shift the position of the spin axis of reticle 242 to any desired position. The shaft connected to the position adjustment of the center of reticle 242 indicated at 246 is also connected to a resolver 247. Search control means 230 may be identical to search control means shown hereinbefore. A gimbal control system 248 is preferably provided including the servo motors 249 and 250 with corresponding pick-offs 251 and 252. However, as distinguished from control system 229, gimbal control system 248 also includes tachometer generators 253 and 254. The output of tachometer generator 254 is impressed upon filter control means generally indicated at 255. Filter control means includes a resolver 256 to receive the output signal of tachometer generator 254. The rotor of the resolver is controlled by the position of the output shaft generally indicated at 257 of servo motor 249. The output of resolver 256 is then impressed upon resolver 247.

Filter control means 255 includes a multiplier 258 to receive an input from resolver 247 to multiply it by a ratio $D/2W$ where D is the distance from the gimbal center to the center of the image field of view on reticle 242 and W is the width of a transparent aperture on reticle 242 at the position of the image field of view center. An adder 259 is connected to the output of multiplier 258 to add a voltage to the output thereof equal to $\omega_0$, which is proportional to the fundamental reticle chopping frequency. The output of adder 259 is impressed upon a function generator 260 which controls the position of the pass band of filter 232 through a servo amplifier 261 and a servo motor 262. As before, function generator 260 matches the output signal of adder 259 to the frequency position versus shaft position of servo motor 262 characteristic of filter 232.

Due to the fact that the frequency of the fundamental alternating output signal of cell 231 in the embodiment of FIG. 22 is the condition upon which the position of the pass band of filter 232 should be varied, a signal proportional to this frequency must be delevoped in connection with the embodiment of FIG. 23. In accordance with the embodiment of the invention shown in FIG. 23, this signal is developed by reference to scan velocity. As before, signals proportional to scan velocity components $\alpha$ and $\beta \cos \alpha$ must be developed because it is necessary to determine the vector components of scan velocity about a pair of orthogonal coordinate axes fixed in the energy collection apparatus. This is performed by tachometer generator 253 and by tachometer generator 254 in conjunction with cosine multiplier 256. Next, it is necessary to determine the component of scan velocity in a direction $\theta+90$ in degrees. This is performed by resolver 247. Multiplier 258 is employed to make the tachometer generator signals compatible with the servo control system 255. The signal $\omega_0$ proportional to the fundamental reticle frequency is employed because this frequency, caused by the spinning motion of reticle 242 about its spin axis produced by spin motor 244 must be added to that produced by scan velocity. Function generator 260, servo amplifier 261, and servo motor 262 operate in substantially the same manner as those illustrated in the embodiments of prior FIGS. 21 and 22.

Another embodiment of the invention is shown in FIG. 24 which may include many of the identical components shown in FIG. 23 including search control means 230, gimbal control system 248, detection assembly 240, detector 237, and recorder 238. A servo control system 255' is employed which may be identical to servo control system 255 with the exception that function generator 260 may be modified. It is modified to match the output frequency versus shaft position characteristic of a variable frequency local oscillator 267. The frequency of oscillator 267 is controlled by varying the capacitance of a capacitor 268 by rotation of the output shaft of a servo motor 262. The output of detection assembly 240 is impressed upon a mixer 269 which is also fed with the output of local oscillator 267. The output of mixer 269 is then, in turn, impressed upon a fixed band pass filter 270, the output of which is connected to detector 237.

In the operation of the embodiment of the invention shown in FIG. 24, the intermediate frequency output of mixer 269 is simply changed by variation of the frequency of the output signal of local oscillator 267 by servo control system 255'. The output frequency of local oscillator 267 is varied in accordance with frequency shift which would be produced by a component of scan velocity in a direction $\theta+90$ in degrees.

Apparatus including a detection assembly 110C which may be employed with the invention is shown in FIGS. 25 and 26. Detection assembly 10C comprises collection apparatus 10C which may be entirely conventional. Collection apparatus 10C is hinged at 24C to gimbals 25C, most of which have been broken away for clarity. Collection apparatus 10C is called a Cassagrain optical mirror system. It incorporates a frusto-conical shaped frame structure 21C in which primary and secondary mirrors 22C and 23C are mounted. Infrared radiation is reflected from mirror 22C to mirror 23C and then toward a reticle assembly 16C. A light baffle 28C is located at the center of a secondary mirror 23C to prevent infrared radiation from entering an aperture in the forward portion of reticle assembly 16C except by that reflected from secondary mirror 23C. Reticle assembly 16C is constructed in accordance with the invention including a reticle having its axis spaced from the optical axis of collection apparatus 10C. Reticle assembly 16C includes a motor M to translate the position of the symmetrical axis of a reticle 17C in a circle about the optical axis of the system. Still further, an additional motor 55C is employed to spin reticle 17C about its symmetrical axis.

The motor M which translates the position of the symmetrical axis of reticle 17C is maintained in a fixed position relative to framework 21C. Motor M is provided with electrical input leads 27C.

An infrared cell, not shown, is located in a Dewar flask 29C in which it is cooled behind reticle assembly 16C. The output of the cell is converted into an electrical signal which is impressed upon output leads 30C.

Reticle 17C is provided with a shaft 34C to which it is fixed and with which it is rotated. This shaft is rotatably mounted in a reticle supporting body 35C. Reticle supporting body 35C is fixed to a gear 36C by means of screws 37C. Gear 36C is driven by a pinion 38C fixed to a shaft of motor M. Shaft 34C is rotatably mounted in bearings 44C and 45C in reticle supporting body 35C. Screws 47C are employed to fix a field stop or supporting member 46 having an aperture 45 to reticle supporting body 35C.

Reticle housing 31C is threaded into a frusto-conical shaped support member 48C. Reticle support member 35C is rotatably mounted in an anular ring 49C on ball bearings 50C, ring 49C being maintained in a fixed position relative to housing 31C by means of screws 51C. Similarly, member 46C is rotatably mounted in housing 31C on ball bearings 52C.

The operation of reticle 17C during a tracking operation is as follows. The position of shaft 34C is continuously translated about the optical axis of the energy collection apparatus 10C in a circle by motor M while motor 55C is simultaneously employed to rotate reticle 17C at a constant angular velocity on shaft 34C.

During searching, it is an outstanding feature of the invention that the same apparatus shown in FIGS. 25 and 27 may be employed to practice the present invention. Thus, the position of reticle 17C about its optical axis of collection apparatus 10C may be controlled independently of its rotational position about its own axis through the use of motor M in addition to motor 55C, whereby a pulse width discriminator may be employed to discriminate against long background lines, or whereby measures may be taken to compensate for frequency shift or frequency modulation due to scan velocity variations.

In FIGS. 27 and 28, alternative apparatus which may be employed to practice the invention is shown including a framework 271 adapted to be mounted in vertical gimbals on shafts 272, an outer cylinder 273 mounted in bearings 274 and 275 in housing 271, and radiant energy collection apparatus 110C' mounted on the forward end of an inner cylinder 276. Cylinders 273 and 276 and bearings 274 and 275 are more clearly illustrated in FIG. 29.

A motor 282 is provided with an output shaft 283 having a pinion 284 fixed thereto to mesh with a gear 285 fixed to outer cylinder 273. Motor 282 is provided with electrical input leads 286. A cell 278 is also provided with electrical output leads 287.

Radiant energy collection apparatus 110C' may be identical to radiant energy collection apparatus 10C shown in FIG. 25. The collection apparatus 110C' may have a reticle assembly mounted therein identical to that shown in FIG. 26. However, in accordance with a motion known as the Palmer scan which may be produced by the apparatus shown in FIGS. 27 and 28, the position of the shaft 34C of reticle 17C need not be translated about the optical axis of the system. Hence, motor M need not be employed and all the structures 46C, 35C and 36C may be fixed to housing 31C and bearings 50C and 52C may be eliminated.

The optical axis of radiant energy collection apparatus 110C' may be tilted with respect to the axis of symmetry of the housing 271 about the central axis of a pair of pins 277 fixed to outer cylinder 273 approximately at the position of the forward end of a radiant energy sensitive cell 278. Pins 277 project through ears 279 which extend from the rearward end of cylinder 276, one being broken away in the view taken of FIG. 29. The optical axis is tilted with respect to the symmetrical axis of housing 271 by means of a threaded bolt 280 which is threaded through outer cylinder 273 and is provided with a rotatable connection with inner cylinder 276 in a bracket 281.

Although a second set of gimbals are not shown, it is to be understood that the housing 271 may be mounted in sets of both vertical and horizontal gimbals as in the case of the detection assembly 110C shown in FIG. 25.

During the operation of the apparatus shown in FIGS. 27 and 28, both in search and in track, outer cylinder 273 is rotated by means of a motor 282 fixed to housing 271. However, the optical axis is tilted in search and held straight in track.

What is claimed is:

1. In an optical system including radiant energy collection apparatus for directing collected energy along a predetermined path, a reticle having alternate adjacent areas relatively opaque and transparent to radiant energy, means for producing relative motion between said reticle and said path to cause said areas to chop radiant energy in a transverse direction across said path in a manner such that all of said areas intercepting said path move in substantially the same direction, and a radiant energy sensitive cell positioned to receive energy transmitted through said reticle transparent areas, the combination comprising: means for moving said radiant energy collection apparatus at a selected vector velocity to scan a selected field of view; and means responsive to the motion of said radiant energy collection apparatus for maintaining a predetermined substantially fixed relationship between the vector yelocity of said collection apparatus and the vector velocity with which the reticle areas move across said path throughout a selected portion of the period during which said collection apparatus scans a selected field of view.

2. In an optical system including radiant energy collection apparatus for directing collected energy along a predetermined path, a reticle having alternate adjacent areas relatively opaque and transparent to radiant energy, means for producing relative motion between said reticle and said path to cause said areas to chop radiant energy in a transverse direction across said path in a manner such that all of said areas intercepting said path move relative to said path in substantially the same direction, and a radiant energy sensitive cell positioned to receive energy transmitted through said reticle transparent areas, the combination comprising: means for moving said radiant energy collection apparatus in a first direction to scan a selected field of view; and controllable means for establishing a substantially fixed relationship between said first direction and a second direction in which said reticle areas move relative to said path.

3. In an optical system including radiant energy collection apparatus for directing collected energy along a predetermined path, a reticle having alternate adjacent areas relatively opaque and transparent to radiant energy, means for producing relative motion between said reticle and said path to cause said areas to chop radiant energy in a transverse direction across said path in a manner such that all of said areas intercepting said path move relative to said path in substantially the same direction, and a radiant energy sensitive cell positioned to receive energy transmitted through said reticle transparent areas, the combinaion comprising: means for moving said radiant energy collection apparatus along a predetermined path to scan a selected field of view; and means responsive to the motion of said radiant energy collection apparatus for maintaining a substantially perpendicular relationship between said path and the direction in which said reticle areas move relative to said path.

4. In an optical system including radiant energy collection apparatus for directing collected energy along a predetermined path, a reticle having alternate adjacent areas relatively opaque and transparent to radiant energy, means for producing relative motion between said reticle and said path to cause said areas to chop radiant energy in a transverse direction across said path in a manner such that all of said areas intercepting said path move relative to said path in substantially the same direction, and a radiant energy sensitive cell positioned to receive energy transmitted through said reticle transparent areas, the combination comprising: means for moving said radiant energy collection apparatus in a first predetermined direction to scan a selected field of view; means for establishing a substantially fixed relationship between said first direction and a second direction in which said reticle areas move relative to said path; and a pulse width discriminator responsive to output signals of said cell for suppressing those output signals having a duration greater than the time that a target dwells in the imaged field of view of said collection apparatus.

5. In an optical system, the combination comprising: radiant energy collection apparatus for directing collected energy along a predetermined path; means for moving said collection apparatus to scan in predetermined directions a predetermined surveillance volume in space; a disc-shaped reticle having alternate adjacent areas relatively opaque and transparent to radiant energy, said reticle being positioned with its axis outside of said path to pass said areas substantially in the same transverse direction across said path; means for rotating said reticle about its axis to chop radiant energy in said path; and means responsive to movement of said collection apparatus for translating the position of the axis of said reticle around said path to maintain the direction along which said opaque and transparent areas thereon cross said path at a predetermined angle with respect to the direction of scan of said collection apparatus.

6. In an optical system, the combination comprising: radiant energy collection apparatus for directing collected energy along a predetermined path; means for moving said collection apparatus to scan in predetermined directions a predetermined surveillance volume in space; a disc-shaped reticle having alternate adjacent areas relatively opaque and transparent to radiant energy, said reticle being positioned with its axis outside of said path to pass said areas substantially in the same transverse direction across said path; means for rotating said reticle about its axis to chop radiant energy in said path; means for maintaining said reticle in a position such that its axis lies approximately on a transverse line through said path in the scanning direction of said collection apparatus; a radiant energy sensitive cell positioned to receive energy transmitted through said reticle transparent areas; and a pulse width discriminator responsive to output signals of said cell for suppressing those output signals having a duration greater than the time that a target dwells in the imaged field of view of said collection apparatus.

7. In an optical system, the combination comprising: radiant energy collection apparatus for directing collected energy along a predetermined path; means to move said radiant energy collection apparatus to scan a selected field of view; a reticle having alternate adjacent areas relatively opaque and transparent to radiant energy, said reticle being adapted to move to cause said areas to chop radiant energy in a transverse direction across said path in a manner such that all of said areas intercepting said path move in substantially the same direction; a cell to intercept the radiant energy transmitted through said reticle transparent areas; a relatively narrow band pass filter to pass alternating output signals of said cell; and means for varying the frequency position of the pass band of said filter in proportion to the vector component of the scan velocity of said collection apparatus perpendicular to said reticle opaque and transparent areas intercepting said radiant energy path.

8. In an optical system including radiant energy collection apparatus for directing collected energy along a predetermined path; means to move said radiant energy collection apparatus to scan a selected field of view; a reticle having alternate adjacent areas relatively opaque and transparent to radiant energy, said reticle being adapted to cause said areas to chop radiant energy in a transverse direction across said path in a manner such that all of said areas intercepting said path move in substantially the same direction; a cell to intercept the radiant energy transmitted through said reticle transparent areas; an intermediate frequency filter having a relatively narrow fixed pass band; a mixer connected between said cell and said filter; a variable frequency oscillator connected to said mixer; and means to vary the oscillation frequency of said oscillator in accordance with the vector component of the scan velocity of said collection apparatus perpendicular to the said reticle opaque and transparent areas intercepting said radiant energy path.

9. In an optical system including radiant energy collection apparatus for directing collected energy along a predetermined path; means to move said radiant energy collection apparatus to scan a selected field of view; a reticle having alternate adjacent areas relatively opaque and transparent to radiant energy, said reticle being adapted to cause said areas to chop radiant energy in a transverse direction across said path in a manner such that all of said areas intercepting said path move in substantially the same direction; a cell to intercept the radiant energy transmitted through said reticle transparent areas; a variable pulse width discriminator to suppress alternating output signals of said cell having a duration greater than the time that a target dwells in the imaged field of view of said collection apparatus; and means to vary the selectivity of said pulse width discriminator to pass output signals of different time durations in accordance with the vector component of the scan velocity of said collection apparatus parallel to said reticle opaque and transparent areas intercepting said radiant energy path.

10. In an optical system including radiant energy collection apparatus for directing collected energy along a predetermined path, a reticle having alternate adjacent areas relatively opaque and transparent to radiant energy, means for producing relative motion between said reticle and said path to cause said areas to chop radiant energy in a transverse direction across said path in a manner such that all of said areas intercepting said path move relative to said path in substantially the same direction, and a radiant energy sensitive cell positioned to receive energy transmitted through said reticle transparent areas, the combination comprising: means for moving said radiant energy collection apparatus at a first vector velocity to scan a selected field of view; means for moving said reticle at a second vector velocity to cause said opaque and transparent areas to pass through said path; and means for controlling one of said vector velocities in accordance with the other.

11. In an optical system including radiant energy collection apparatus for directing collected energy along a predetermined path, a reticle having alternate adjacent areas relatively opaque and transparent to radiant energy, said reticle being adapted to cause said areas to chop radiant energy in a transverse direction across said path in a manner such that all of said areas intercepting said path move in substantially the same direction, and a radiant energy sensitive cell positioned to receive energy transmitted through said reticle transparent areas, the combination comprising: first means for moving said radiant energy collection apparatus; second means for moving said reticle; third means for selectively operating said first and second means to cause said collection apparatus to scan a predetermined field of view and to cause said reticle to move at a speed and in a direction in accordance with the vector scan velocity of said collection apparatus during searching operations, and fourth means to cause said collection apparatus to follow a target and to cause said reticle to move in a changing transverse direction across said path during tracking operations.

12. In an optical detection system for surveying a volume of space to detect the conditional presence of objects therein from which emanates optically detectable electromagnetic radiation, the combination of: radiant energy collection apparatus for collecting radiant energy and directing the energy so collected to form an image, at an image plane, representing the instantaneous field of view embraced by the collection apparatus, said collection apparatus having limited resolution characteristics substantially definable by the optical blur circle specification of the apparatus; a substantially planar chopping reticle positioned at said image plane, said reticle being so constructed as to impose, at said image plane, a pattern of equally spaced apart substantially alike bands relatively opaque to collected radiant energy, the space between any two adjacent bands being substantially the same as the width of the bands themselves along a line bisectiong the image, the space between adjacent bands as defined by the edges of said bands being at all points, within the image, of the same order of magnitude as the maximum linear dimension of the blur circle characterizing said energy collection apparatus, the space between the bands being relatively transparent to collected radiant energy as compared to the bands themselves, the position of said reticle relative to said image plane being such that adjacent edges of all bands embraced by said image extend generally in the same direction throughout said image; means mechanically coupled to said chopping reticle and collection apparatus for causing said reticle to move with respect to the instantaneous field of view imaged at said image plane to effectively chop, by motion of said bands, the radiant energy imaged at said plane; control means coupled to said chopping reticle and collection apparatus for controlling the relative direction with which the edges of said bands move with respect to said image; driving means coupled to said energy collection apparatus for causing the instantaneous field of view sustained by said apparatus to movingly scan a volume of space such that the vectorial direction with which the instantaneous field of view is moved, with respect to a reference position in the space scanned, is subject to variation; and means coupling said driving means to said control means for controlling the relative direction with which the edges of said band move with respect to said image as a direct function of the vectorial direction with which the instantaneous field of view is moved in space.

13. In an optical detection system for surveying a volume of space to detect the conditional presence of objects therein from which emanates optically detectable electromagnetic radiation, the combination of: radiant energy collection apparatus for collecting radiant energy and directing the energy so collected to form an image, at an image plane, representing the instantaneous field of view embraced by the collection apparatus, said collection apparatus having limited resolution characteristics substantially definable by the optical blur circle specification of the apparatus; a substantially planar chopping reticle positioned at said image plane, said reticle being so constructed as to impose, at said image plane, a pattern of equally spaced apart substantially alike bands relatively opaque to collected radiant energy, the space between any two adjacent bands being substantially the same as the width of the bands themselves taken along a line bisecting the image, the space between adjacent bands as defined by the edges of said bands being at all points, within the image, of the same order of magnitude as the maximum linear dimension of the blur circle characterizing said energy collection apparatus, the space between the bands being relatively transparent to collected radiant energy as compared to the bands themselves, the position of said reticle relative to said image plane being such that adjacent edges of all bands embraced by said image extend generally in the same direction throughout said image; first driving means mechanically coupled to said chopping reticle and collection apparatus for causing said reticle to continuously move with respect to the instantaneous field of view imaged at said image plane to effectively chop, by motion of said bands, all radiant energy imaged at said plane; direction control means coupled to said chopping reticle and collection apparatus for controlling the relative direction with which the edges of said bands move with respect to said image; second driving means coupled to said energy collection apparatus for causing the instantaneous field of view sustained by said apparatus to controllably move within a volume of space such that the vectorial direction with which the instantaneous field of view is moved, with respect to a reference position in the space scanned, is subject to variation; scan control means operatively coupled to said second driving means for controlling the scanning motion of the instantaneous field of view to execute the following of a predetermined pattern of search; means coupled to said energy collection apparatus and said direction control means for controlling the relative direction with which the edges of said band move with respect to said image as a direct function of the vectorial direction with which the instantaneous field of view is moved in space only during its execution of said predetermined pattern of search; means coupled to said energy collection apparatus and responsive to the energy chopped by said reticle to develop an indicating signal whenever an object, the image of which on said image plane is of the same order of magnitude as said blur circle, is embraced by the instantaneous field of view of said energy collection apparatus; means coupled to said scan control means for conditionally disabling the action of said scan control means upon the development of an indicating signal; means responsive to said indicating signal and operatively coupled to said second driving means for tracking the motion of an object producing said indicating signal, to keep the object within the instantaneous field of view; and means coupled to said direction control means for causing the relative direction with which the edges of said reticle bands move with respect to the image of said object to continuously change in a uniform periodic manner, during the tracking of an object.

14. In an optical detection system for surveying a field of view to detect the conditional presence of objects from which emanate optically detectable electromagnetic radiation, the combination of: radiant energy collection apparatus for collecting radiant energy and directing the energy so collected to form an image, at an image plane, representing the instantaneous field of view embraced by the collection apparatus; a chopping reticle positioned at said image plane of said collection apparatus, said reticle having portions thereof which are relatively opaque to collected radiant energy and other portions thereof which are relatively transparent to collected radiant energy; means mechanically coupled to said chopping reticle and collection apparatus for causing said reticle to move with respect to the instantaneous field of view imaged at said image plane to effectively chop, by motion of said opaque portions across the image, the radiant energy imaged at said plane; reticle control means coupled to said chopping reticle and collection apparatus for controlling the relative direction with which the opaque portions of said reticle move across said image; driving means coupled to said energy collection apparatus for causing the instantaneous field of view sustained by said apparatus to movingly scan a volume of space such that the vectorial direction with which the instantaneous field of view is moved with respect to a reference position in space is subject to variation; and means coupling said driving means to said reticle control means for controlling the relative direction with which said opaque portions of said reticle move with respect to said image as a direct function of the vectorial direction with which the instantaneous field of view is moved in space.

References Cited by the Examiner

UNITED STATES PATENTS

| | | | |
|---|---|---|---|
| 2,762,123 | 9/1956 | Schultz et al. | 33—1 |
| 2,763,840 | 9/1956 | Pfleger | 333—17 |
| 2,866,906 | 12/1958 | Peek | 250—200 |
| 2,884,540 | 4/1959 | Shockley | 250—200 |
| 2,892,124 | 6/1959 | Rabinow | 88—1 |
| 2,895,049 | 7/1959 | Astheimer et al. | 250—65 |
| 2,900,519 | 8/1959 | Sorel et al. | 250—83.3 |
| 2,921,273 | 1/1960 | Broadhead et al. | 333—17 |
| 2,930,894 | 3/1960 | Bozeman | 88—1 |
| 2,942,118 | 6/1960 | Gedance | 250—203 |
| 2,987,622 | 6/1961 | Berry | 250—83.3 |
| 3,053,984 | 9/1962 | Hulett | 250—203 |
| 3,076,095 | 1/1963 | Becklund et al. | 250—203 |

RALPH G. NILSON, *Primary Examiner.*

CHESTER L. JUSTUS, *Examiner.*

UNITED STATES PATENT OFFICE
CERTIFICATE OF CORRECTION

Patent No. 3,230,379　　　　　　　　　　　January 18, 1966

George F. Aroyan, et al.

It is hereby certified that error appears in the above numbered patent requiring correction and that the said Letters Patent should read as corrected below.

Column 5, line 33, for "wih" read -- with --; column 9, line 45, after "vector" insert -- velocity of those reticle apertures embraced by the imaged field --; column 16, line 34, after "velocity" insert -- vector --; column 22, line 16, for "shift" read -- shaft --.

Signed and sealed this 19th day of September 1967.

(SEAL)
Attest:

ERNEST W. SWIDER
Attesting Officer

EDWARD J. BRENNER
Commissioner of Patents